US012755580B2

(12) United States Patent
Hudson et al.

(10) Patent No.: US 12,755,580 B2
(45) **Date of Patent: *Oct. 6, 2026**

(54) PARKING METER SYSTEM

(71) Applicant: Municipal Parking Services, Inc., Golden Valley, MN (US)

(72) Inventors: Thomas G. Hudson, Tonka Bay, MN (US); Joseph M. Caldwell, Austin, TX (US); Richard C. Gage, Orono, MN (US)

(73) Assignee: Municipal Parking Services Inc., Golden Valley, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/370,463

(22) Filed: Oct. 27, 2025

(65) Prior Publication Data

US 2026/0051200 A1 Feb. 19, 2026

Related U.S. Application Data

(63) Continuation of application No. 19/075,436, filed on Mar. 10, 2025, which is a continuation of application No. 18/943,400, filed on Nov. 11, 2024, now Pat. No. 12,249,187, which is a continuation of application No. 18/214,274, filed on Jun. 26, 2023, now Pat. No. 12,142,085, which is a continuation of application No. 17/671,428, filed on Feb. 14, 2022, now Pat. No. 11,688,205, which is a continuation of application No. 16/900,987, filed on Jun. 14, 2020, now Pat. No. 11,257,302, which is a continuation of application No. 16/579,816, filed on Sep. 23, 2019, now Pat. No. 10,685,501, which is a continuation of application No. 16/195,828, filed on Nov. 19, 2018, now Pat. No. 10,424,125, which is a continuation of application (Continued)

(51) Int. Cl.
*G07B 15/02* (2011.01)
*G07F 17/24* (2006.01)

(52) U.S. Cl.
CPC .......... *G07B 15/02* (2013.01); *G07F 17/246* (2013.01)

(58) Field of Classification Search
CPC .............................. G07B 15/02; G06F 17/246
USPC ........................................................... 705/13
See application file for complete search history.

(56) References Cited

U.S. PATENT DOCUMENTS

| | | | |
|---|---|---|---|
| 4,603,390 | A | 7/1986 | Mehdipour et al. |
| 7,104,447 | B1 | 9/2006 | Lopez et al. |

(Continued)

FOREIGN PATENT DOCUMENTS

| | | | |
|---|---|---|---|
| GB | 2272235 | A | 5/1994 |
| GB | 2442503 | A | 4/2008 |

(Continued)

*Primary Examiner* — Allyson N Trail
(74) *Attorney, Agent, or Firm* — Skaar Ulbrich Macari, P.A.

(57) ABSTRACT

A parking enforcement system can include a weather resistant housing, a processor disposed inside of the housing, a memory disposed inside of the housing and coupled to the processor, a network interface disposed in the housing and coupled to the processor, a first camera disposed in the housing and facing outward towards a first parking space. The processor can be configured to recognize when a vehicle first occupies the first parking space and determine a classification for the vehicle.

30 Claims, 25 Drawing Sheets

Related U.S. Application Data

No. 15/714,916, filed on Sep. 25, 2017, now Pat. No. 10,134,201, which is a continuation of application No. 14/164,177, filed on Jan. 25, 2014, now Pat. No. 9,773,351.

(60) Provisional application No. 61/887,319, filed on Oct. 4, 2013, provisional application No. 61/887,324, filed on Oct. 4, 2013, provisional application No. 61/794,596, filed on Mar. 15, 2013, provisional application No. 61/756,854, filed on Jan. 25, 2013.

(56) References Cited

U.S. PATENT DOCUMENTS

| | | | | |
|---|---|---|---|---|
| 7,355,527 | B2 | 4/2008 | Franklin et al. | |
| 12,073,629 | B1 | 8/2024 | Manyam | |
| 2002/0141618 | A1 | 10/2002 | Ciolli et al. | |
| 2003/0128136 | A1* | 7/2003 | Spier | G08G 1/14 705/13 |
| 2005/0040226 | A1 | 2/2005 | Al-Sheikh | |
| 2007/0085704 | A1 | 4/2007 | Long | |
| 2007/0222581 | A1* | 9/2007 | Hawkins | G07F 17/24 340/539.1 |
| 2008/0255901 | A1* | 10/2008 | Carroll | G06Q 30/0241 705/1.1 |
| 2010/0191674 | A1 | 7/2010 | Condon | |
| 2011/0218940 | A1 | 9/2011 | Bergstrom et al. | |
| 2011/0313822 | A1 | 12/2011 | Burdick | |
| 2012/0095791 | A1* | 4/2012 | Stefik | G08G 1/147 705/13 |
| 2012/0127308 | A1* | 5/2012 | Eldershaw | G08G 1/147 340/932.2 |
| 2012/0130775 | A1 | 5/2012 | Bogaard et al. | |
| 2012/0130891 | A1 | 5/2012 | Bogaard et al. | |
| 2012/0185325 | A1* | 7/2012 | Shani | G06Q 30/0275 705/14.43 |
| 2012/0234906 | A1 | 9/2012 | Ganapathi | |
| 2012/0323690 | A1* | 12/2012 | Michael | G01C 21/3605 705/14.58 |
| 2013/0214041 | A1 | 8/2013 | Wright | |
| 2014/0344026 | A1 | 11/2014 | Outwater et al. | |
| 2015/0049914 | A1 | 2/2015 | Alves | |
| 2015/0063646 | A1 | 3/2015 | Wang et al. | |
| 2015/0220791 | A1 | 8/2015 | Wu et al. | |
| 2017/0124395 | A1 | 5/2017 | Cohen et al. | |

FOREIGN PATENT DOCUMENTS

| | | | |
|---|---|---|---|
| WO | 9805015 | A2 | 2/1998 |
| WO | 03036569 | A1 | 5/2003 |
| WO | 2006000089 | A1 | 1/2006 |
| WO | 2007025364 | A1 | 3/2007 |
| WO | 2012109753 | A1 | 8/2012 |
| WO | 2014012998 | A1 | 1/2014 |

* cited by examiner

PARKING METER SYSTEM

PRIORITY

This application is a continuation of U.S. application Ser. No. 19/075,436, filed on Mar. 10, 2025, which is a continuation of U.S. application Ser. No. 18/943,400, filed on Nov. 11, 2024, now U.S. Pat. No. 12,249,187, which is a continuation of U.S. application Ser. No. 18/214,274, filed on Jun. 26, 2023, now U.S. Pat. No. 12,142,085, which is a continuation of U.S. application Ser. No. 17/671,428, filed on Feb. 14, 2022, now U.S. Pat. No. 11,688,205, which is a continuation of U.S. application Ser. No. 16/900,987, filed on Jun. 14, 2020, now U.S. Pat. No. 11,257,302, which is a continuation of U.S. application Ser. No. 16/579,816, filed on Sep. 23, 2019, now U.S. Pat. No. 10,685,501, which is a continuation of U.S. application Ser. No. 16/195,828, filed on Nov. 19, 2018, now U.S. Pat. No. 10,424,125, which is a continuation of U.S. application Ser. No. 15/714,916, filed on Sep. 25, 2017, now U.S. Pat. No. 10,134,201, which is a continuation of U.S. application Ser. No. 14/164,177, filed on Jan. 25, 2014, now U.S. Pat. No. 9,773,351, which claims the priority benefit of U.S. Provisional Application No. 61/756,854 filed on Jan. 25, 2013, U.S. Provisional Application No. 61/794,596 filed on Mar. 15, 2013, U.S. Provisional Application No. 61/887,319 filed on Oct. 4, 2013 and U.S. Provisional Application No. 61/887,324 filed on Oct. 4, 2013. All of the foregoing applications are all hereby incorporated by reference in their entirety herein.

FIELD

The present invention relates to parking meters and, more particularly, to automated parking meter systems.

BACKGROUND

Prior parking meters are known which increase revenues by detecting the presence or absence of a vehicle. For example, U.S. Pat. No. 4,823,928 describes an electronic parking meter system that resets the timing circuit to zero when a vehicle is no longer detected in the associated parking space. Such parking meter is placed into operational mode when a coin or other payment method is input into the meter. Then a sonar range finder is turned on to detect the presence or absence of a vehicle in the associated parking space. The sonar range finder is also used to provide a signal to a microprocessor controller when the vehicle is no longer in the associated parking space. The microprocessor controller then resets the timer.

The above-noted parking meter system may improve revenue, but it does not capture parking meter violations. Therefore it does not optimize revenue or provide a deterrent for parking violators because there are few parking meter attendants to police the many metered spots in any given jurisdiction. Employing more meter attendants is not a cost-effective solution either. This problem was addressed by the parking meter of U.S. Pat. No. 5,777,951.

The device of U.S. Pat. No. 5,777,951, which is hereby incorporated by reference in its entirety, is a parking meter system including a camera to record and store the image of the license plate of a parking violator. The parking meter includes a microcontroller and a timer coupled with the microcontroller. The payment acceptance means is coupled with the microcontroller for accepting payment for use of an associated parking space. The microcontroller initiates the timer for a prepaid parking interval upon receiving a signal from the payment acceptance means. A vehicle detection means is coupled with the microcontroller for detecting the presence or absence of a vehicle in the associated parking space. A communications modem is coupled with the microcontroller. The microprocessor initiates a camera to take an image of a vehicle upon the vehicle detection means signaling to the microprocessor the presence of the vehicle in the associated parking space after the timer has signaled to the microprocessor the expiration of the prepaid parking interval.

U.S. Pat. Nos. 7,029,167 and 7,393,134, both of which are hereby incorporated by reference in their entirety, disclose improvements to the device of the U.S. Pat. No. 5,777,951 patent. However, in both of these patents, the microcontroller initiates an interrogation station to direct an interrogation signal at the associated parking space in the area of the parking space where the license plate of a parked vehicle is located upon determining the existence of a parking violation.

Taking pictures of the vehicle or its license plate after determining a violation can be unreliable because an unacceptably high number of violations may not be caught if a violation cannot be determined before the vehicle leaves the camera's field of view. Therefore, there remains a need for improved parking meter systems that addresses some or all of the drawbacks in the prior art.

SUMMARY

The parking management technology herein is directed to parking lots, ramps and streets for monitored parking use and for ticketing as required by system software logic without the need for on-premises attendant personnel. The invention can be used, for example, for unattended lots, ramps and street situations. The lot monitoring embodiments discussed herein eliminate the cost of lot monitoring personnel and also automatically capture all violators. Thus revenue is enhanced.

A parking meter according to certain embodiments includes a housing, processor, memory, network interface, graphical user interface, first camera disposed in the housing and facing outward from the first side of the housing, microphone, speaker, second camera disposed in the housing and facing outward from the housing towards a parking space, a status light, and a payment acceptor. The meter is configured to sense a vehicle's presence in the parking space, capture an identification of the vehicle, transmit the identification to a remote networked computer system, determine that a parking violation has occurred, transmit the notice to the remote computer system, accept payment of fines, transmit notice of fine payment to the remote computer system, transmit a time of the vehicle's exit from the first parking space to the remote computer system via the network interface, and reset the parking time period to zero upon the vehicle's exit from the parking space.

A method of monitoring and managing parking in certain embodiments includes sensing a vehicle's presence in a first parking space. An identification of the vehicle is determined via a camera and the identification of the vehicle is communicated to a remote networked computer system. The meter determines that a parking violation has occurred due to either an initial grace period expiring without receiving a payment or a parking time period expiring without the vehicle exiting the first parking space prior the parking period expiring. Notice of the parking violation is communicated to the remote networked computer system. A violation notice is displayed on the graphical user interface of the meter along with the amount of fine due, and a discount fine amount if the fine is paid before the vehicle departs the first parking space. The meter communicates status of payment of the fine to the remote computer system via the network interface and transmits a time of the vehicle's exit from the first parking space to the remote computer system via the network interface. The parking time period is reset to zero upon the vehicle's exit from the first parking space.

A method of managing parking via a parking meter in certain embodiments includes receiving a selection of a parking time quantity by a user by the user providing an input to the meter. A total parking fee is calculated in response to the selected amount of parking time. The parking time is subject to variable pricing such that the total parking fee comprises a first parking rate for a first portion of the selected amount of time and a second parking rate for a second portion of the selected amount of parking time, wherein the second parking rate being different than the first parking rate. The first parking rate and a first subtotal fee portion for the first portion of the selected amount of time is displayed on the graphical user interface. The second parking rate and a second subtotal fee portion for the second amount of time is also displayed on the graphical user interface. The total parking fee on the graphical user interface is further displayed so that the user can quickly and easily appreciate the constituent portions of the total parking fee.

In certain embodiments, a set of class rules can be applied to change the parking parameters for a given parking event. The class rules can correspond to the identification a particular vehicle or can correspond to an input to the meter. Parking parameters can also be set and updated by a remote computer system networked to the parking meter.

The present invention in certain embodiments increases revenue compared to traditional manual parking meters and manual parking enforcement methods. Traditional parking meters charge for time used or paid for by consumer. It may not reset when a car leaves, permitting usage by the next customer of the remaining previously-paid time. It may provide an alert to a Parking Enforcement Officer for a violation, which can then be manually written and issued. Certain embodiments of the invention can be configured to automatically reset upon cars departure, and auto enforce any violation without the need for an officer's presence.

In certain embodiments, the invention provides for irrefutable proof of the violation with license plate pictures upon entry, violation and exit by the car.

Certain embodiments can perform license plate recognition (LPR) and transmit the jpg and the ASCII data to a remotely-located networked site for query to the respective department of motor vehicles, issuance of a citation through the mail and fine collections.

Certain embodiments can provide for city safety and community communications services. Such services can include, but are not limited to: fine payments at the meter; scofflaw identification; stolen vehicle identification; amber alerts; emergency broadcasts; area monitoring for law enforcement; car tracking for law enforcement; community messaging for mayoral and other city notices; sudden emergencies by location, region, or city wide; merchant coupons, merchant advertising, public notices, directions, directories, concierge services, summoning of vehicle help; 911 calls; 311 calls; any calls; summoning of medical assistance; reporting of fires; summoning police; displaying vendor ads and serving coupons, and others.

A wide variety of payment alternatives and pricing features can be included in certain embodiments, including flexible grace periods; fine free insurance; street signage replacement with on screen parking notices and regulations; variable pricing by time of day, week, event; progressive pricing by duration of stay; permit parking management by LPR; all centrally managed and remotely distributed by the city parking department, police or other designated agency. In addition, each camera can be commanded to allow web-enabled remote viewing via smart-phone, tablet, or computer for lawful surveillance and security applications. Thus, in certain embodiments, the invention is a community kiosk possessing many diverse automated city applications for parking, safety, security, and real-time connectivity to web-hosted management and integrated communications and can provide a wide variety of city services like nothing before.

The above summary is not intended to limit the scope of the invention, or describe each embodiment, aspect, implementation, feature or advantage of the invention. The detailed technology and preferred embodiments for the subject invention are described in the following paragraphs accompanying the appended drawings for people skilled in this field to well appreciate the features of the claimed invention. It is understood that the features mentioned hereinbefore and those to be commented on hereinafter may be used not only in the specified combinations, but also in other combinations or in isolation, without departing from the scope of the present invention.

DETAILED DESCRIPTION

Figure 1:
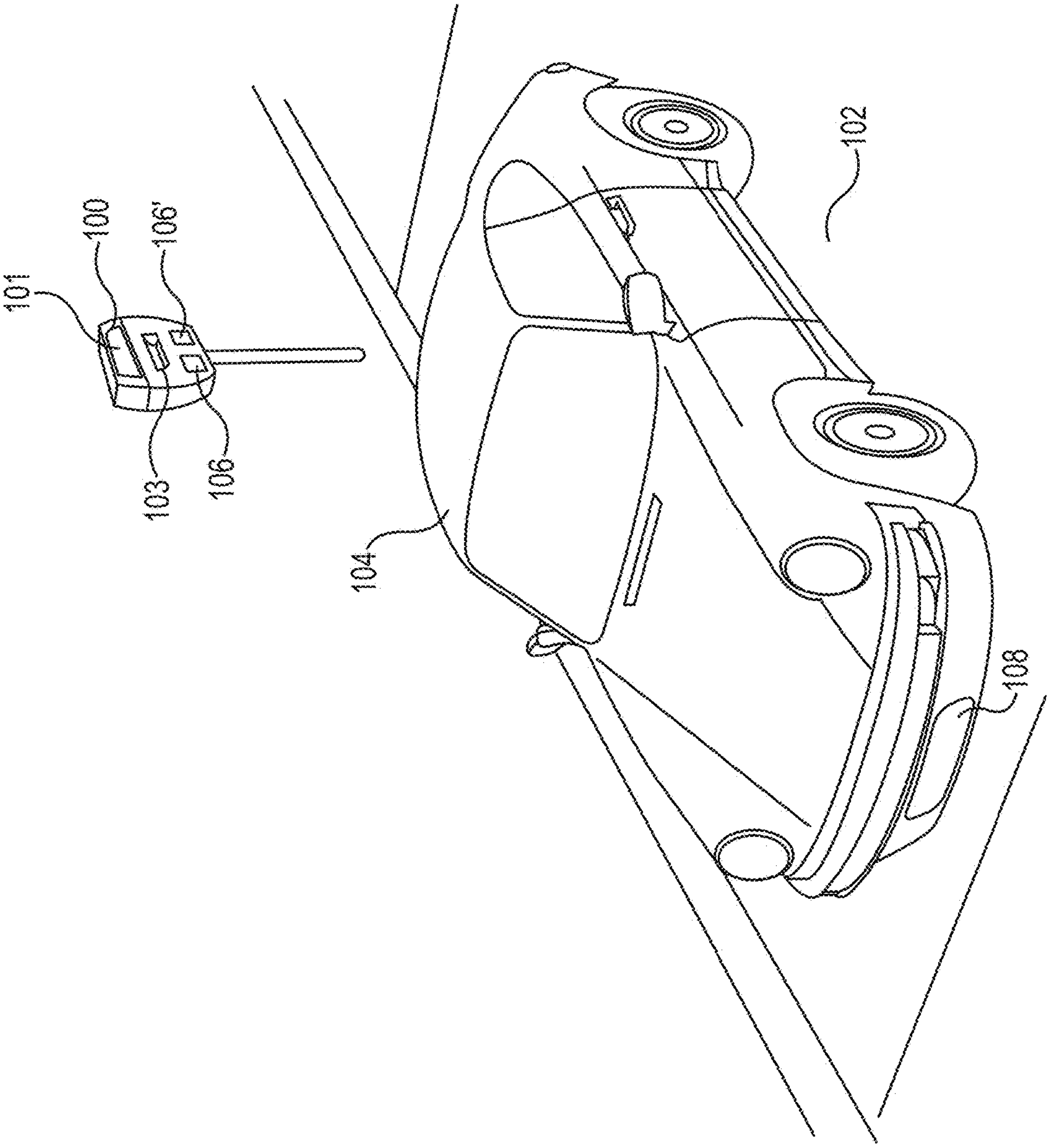
FIG. 1 is a perspective view of a parking meter according to certain embodiments of the invention.

While the invention is amenable to various modifications and alternative forms, specifics thereof have been shown by way of example in the drawings and will be described in detail. It should be understood, however, that the intention is not to limit the invention to the particular example embodiments described. On the contrary, the invention is to cover all modifications, equivalents, and alternatives falling within the scope of the invention as defined by the appended claims.

In the following descriptions, the present invention will be explained with reference to various example embodiments; nevertheless, these embodiments are not intended to limit the present invention to any specific example, environment, application, or particular implementation described herein. Therefore, descriptions of these example embodiments are only provided for purpose of illustration rather than to limit the present invention. The various features or aspects discussed herein can also be combined in additional combinations and embodiments, whether or not explicitly discussed herein, without departing from the scope of the invention, Referring to FIG. 1, there is illustrated parking meter 100 and an associated parking space 102. The meter includes a graphical user interface (GUI) 101. The GUI 101 can be located on one or both of the front and back sides of the meter. The GUI can be touch sensitive or a separate key pad can be provided to the meter for data entry, or both touch screen and key pad can be provided. The GUI can be configured as a backlit LCD display. A card reader 103 mechanism can also be disposed in the meter to facilitate card-based payments.

A vehicle 104 is parked in the associated parking space 102. The meter 100 includes one or more cameras 106 disposed in its housing. The cameras 106 are configured to identify the presence and absence of a vehicle in the associated parking spot 102. The cameras take images of the vehicle, and/or its identification plate 108. The cameras can also take video captures as well. The camera shown in FIG. 1 is located to observe the rear license plate of vehicle 102. However, the camera can be located directly in front of the vehicle 102 to image its front plate 108 instead. Note also that a second camera 106' is located to image a front plate of the vehicle in a spot behind the vehicle as shown. Thus, one meter can service two adjacent spots.

A single camera can alternatively be used to cover two or more associated parking spots by employing a wide angle lens or a movable camera.

The camera(s) can be within the main meter housing as shown in FIG. 1, or they can be in their own housing on the meter pole or mounted to a separate location remote from the meter.

The camera captures a digital image of the vehicle and/or its license plate. The camera can be a commercially available plate reading camera or can be any suitable digital camera. An optical character recognition process (license plate recognition or LPR) can be used to extract the plate alpha numerals for transmission to a database or other destination.

Figure 2:
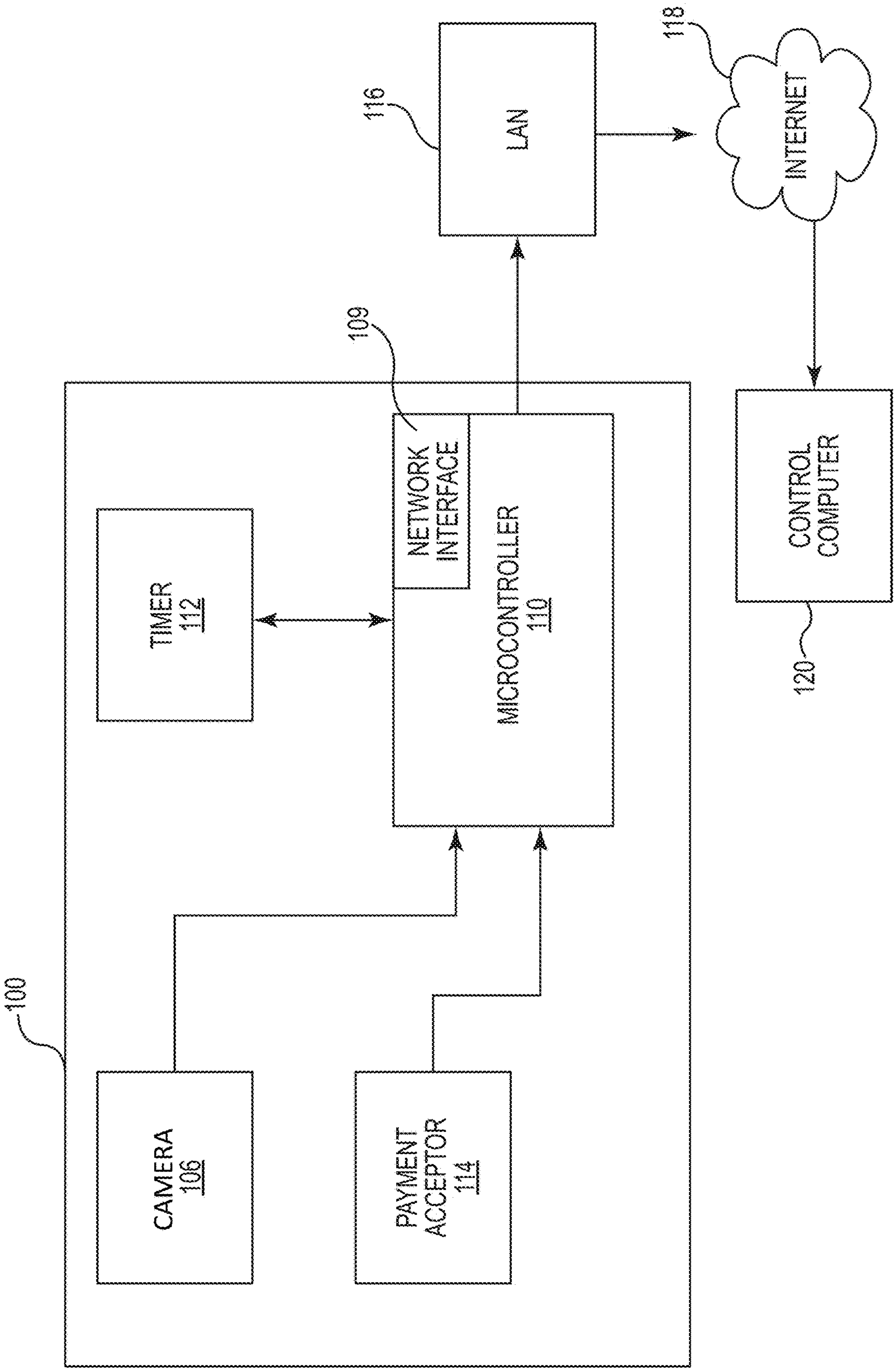
FIG. 2 is a block diagram of components of a parking meter system according to certain embodiments of the invention.

Referring to FIG. 2, the internal components of the parking meter 100 and a parking meter will be discussed. A microcontroller 110, or processor, with associated physical memory is disposed inside of the housing of the meter 100. The software code controlling the operation and function of the meter is stored in the memory. The memory may include one or more non-volatile storage devices and/or one or more volatile storage devices (e.g., random access memory (RAM)).

Computer readable program code is stored in the memory, such as, but not limited to magnetic media (e.g., a hard disk), optical media (e.g., a OVO), memory devices (e.g., random access memory, flash memory), etc. The computer readable program code is configured such that when executed by a processor, the code causes the network connected device to perform the steps of the invention described herein. In other embodiments, the device is configured to perform steps described below without the need for code.

A timer 112 is coupled with and controlled by the microcontroller 110. The controller can also count processor clock cycles as a form of timer. The camera 106 is coupled with and in two-way communication with the microcontroller 110. A payment acceptance mechanism 114 is also coupled with and sends signals to microcontroller 110. Additional components such as the GUI 101 and any other lights, cameras, sensors, etc. are also connected in operable communication with the microcontroller.

The payment acceptance mechanism 114 can be configured to accept payment by any one or more conventional means, including coin, paper bill, token, coupon, credit/debit card, smart phone or a combination thereof. The payment acceptor 114 can also be configured to accept contactless payments. In one embodiment of accepting contactless payments, a near field communications (NFC) component is disposed in the meter to accepting mobile payments using, for example, services such as such as Google Wallet, PayPal, EZ Pass and Pay Pass. Virtual currencies such as Bitcoin and the like can also be accepted. A QRS picture can also be displayed on the meter's screen for the user to scan with their phone to submit payment with an appropriate application on their phone enabling such payment method.

In alternative embodiments, various types of sensors can be used to detect the presence and absence of a vehicle in an associated parking spot other than by use of the camera. For example, an ultrasonic sensor, a light sensor, a pressure sensor (in the pavement), a magnetic field sensor, sonar and radar sensors can all be used as alternatives. Each can be incorporated in the meter housing, on a separate mount, or embedded in the road or curb. Any of these alternatives are operatively connected to the microprocessor 110, which can determine the presence/absence of a vehicle based upon the state change information returned from the particular sensor employed. The remainder of the operation and components are as otherwise described herein.

The meter 100 further includes a network interface 109 either integrated into the microcontroller, or as a separate component. The network interface is configured to enable communication with a communication network (e.g. a local area network (LAN 116), the Internet or World Wide Web), using a wired and/or wireless connection. Network communication means include, but are not limited to, Wi-Fi, Bluetooth, cellular (HSPA, LTE, GSM, CDMA), DSL, cable, etc. The LAN 116 may include other meters all in communication with a master or main meter for a plurality of dependent meters. In LAN configuration, the LAN 116 can be connected to the Internet 118 as illustrated in FIG. 2.

The parking system may also include a host or control computer 120 that governs the operation of and/or stores the data from a given number of networked meters. The central or control computer 120 may comprise one or more servers interfacing with networked storage in a data center. The control computer 120 is located remotely in a secure location for convenience and security purposes. The LAN 116, in turn, is connected to the World Wide Web (i.e. internet) in order to be in communication with a variety of other computing systems, including law enforcement and operations companies. This way, the data can be securely stored and reviewed by appropriate authorities and the operations of all meters in a given system can be monitored and remotely controlled via a central operator.

Figure 3:
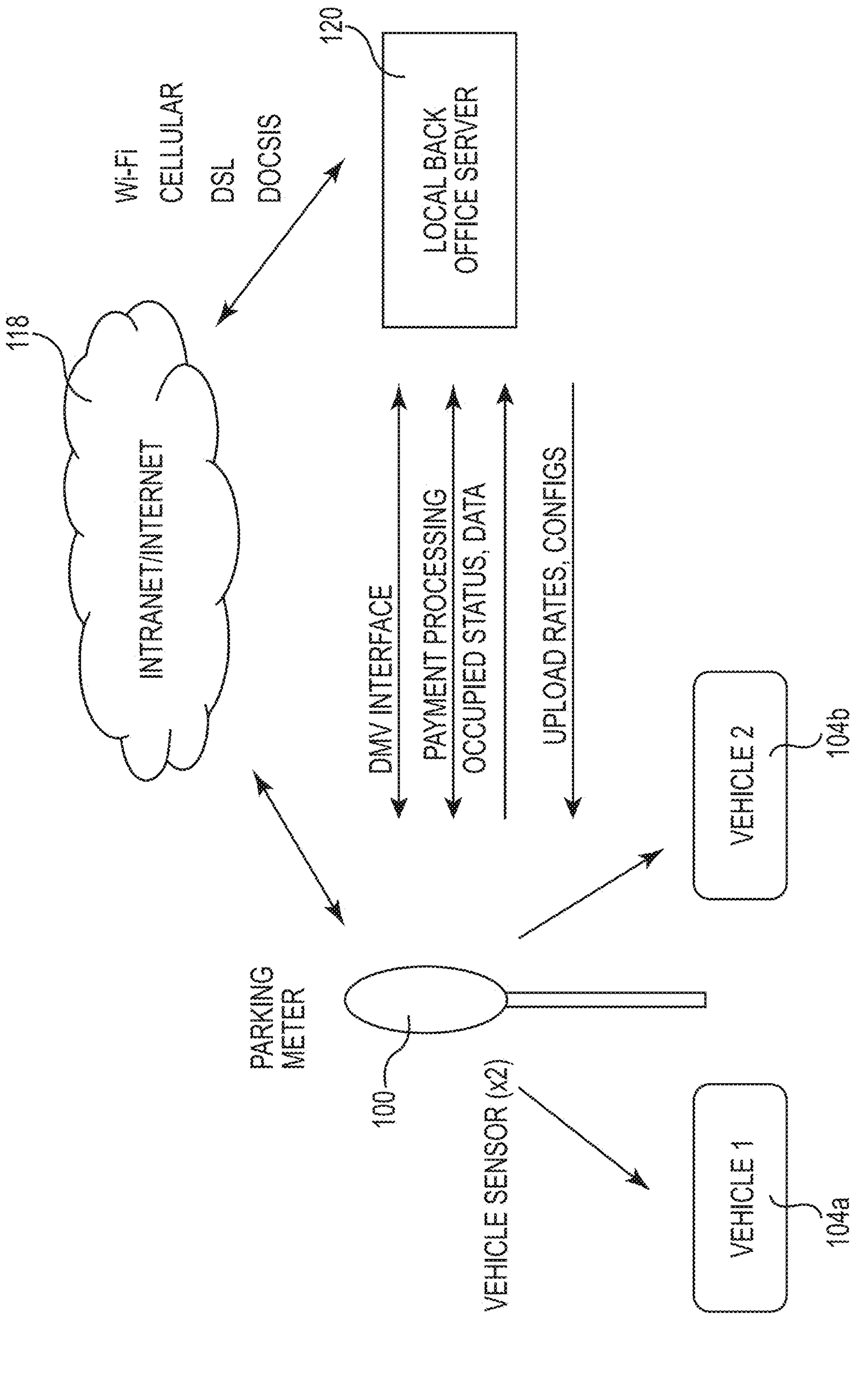
FIG. 3 is a block diagram of components of a parking meter system according to certain embodiments of the invention.

FIG. 3 provides a communication diagram of certain components of a parking system according to certain embodiments. The parking meter 100 includes two vehicle sensors, each associated with a specific parking spot. The meter 100 periodically queries the sensors to determine whether a first vehicle **104*a* or a second vehicle 104*b* is present in the corresponding space. The meter 100 is also in communication via a LAN, Internet, Intranet, etc. with a back office server or computer 120**. Data exchanged with the back office server include occupied/unoccupied status of the monitored spaces, the meter's unique identification data, payment processing information, LPR data, video and image data, maintenance data, operational status, and other data as desired by the operator and the department of motor vehicle in the municipality where the meter is located. The back office SAAS server, in certain embodiments, can also supply the meter with configuration data, including parking rates, and display messages for the meter's GUI.

The meter 100 is equipped with a license plate reading means responsive to the vehicle identification means employed by the licensing authority where the meter is located. For example, if the license plate provides alphanumeric data, then the meter is equipped to read the alphanumerals. This can be accomplished with equipping the meter with so-called license plate reading (LPR) software that reads or converts the image of the license plate taken by the camera(s) to alphanumeric text. If the plate (or other part of the vehicle) is equipped with a radiofrequency ID tag (RFID), then the meter is equipped with an RFID tag reader. And if the plate (or other portion of the vehicle) is equipped with a machine readable barcode or transmitter/receiver (e.g. a matrix barcode) then the meter is equipped with a transmitter receiver (to read plate, vin, driver info) or with a bar code reading device. The reading means in each instance is in operable communication with the microprocessor. Multiple reading means can be included in a single or multi-space meter system to allow the system to adapt to a variety of licensing methodologies.

Figure 5:
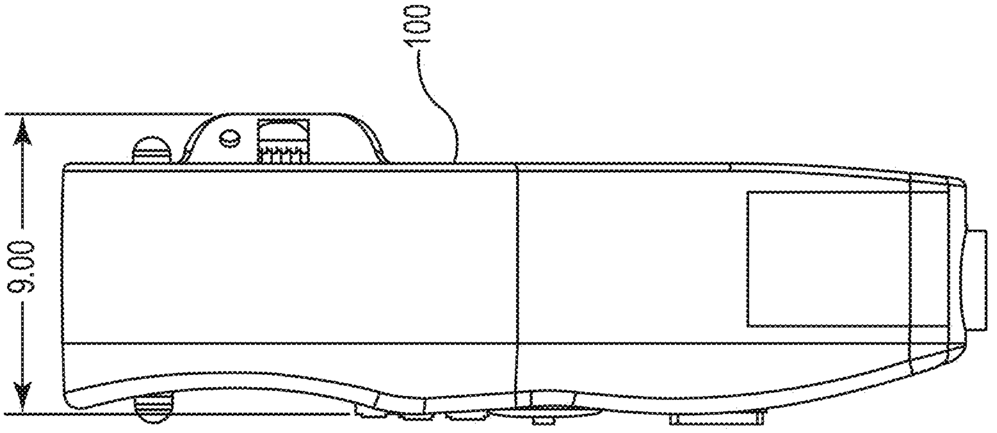
FIG. 5 is a side view of a parking meter according to certain embodiments of the invention.
Figure 4:
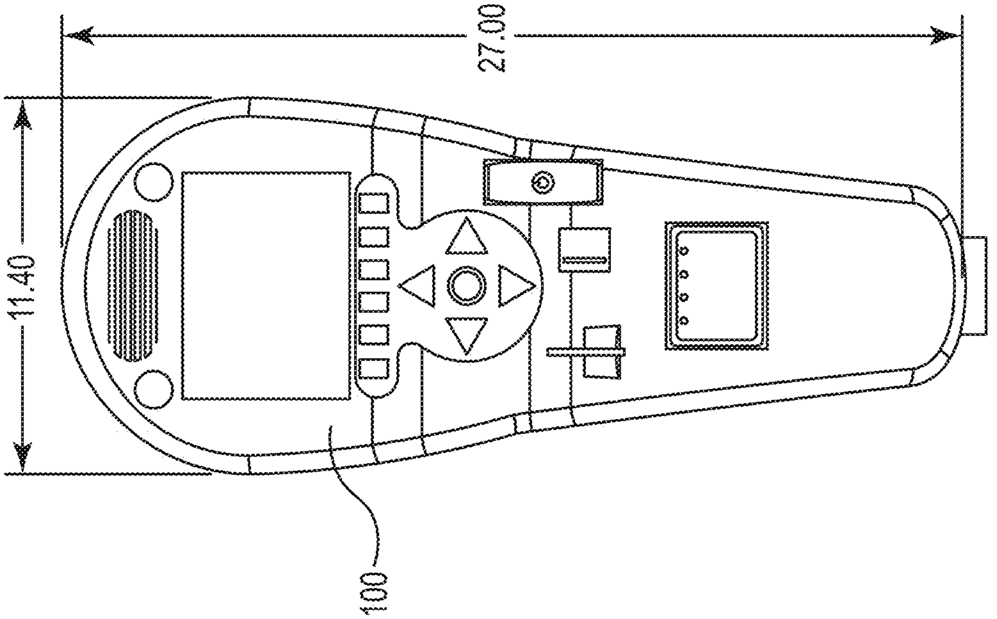
FIG. 4 is a front view of a parking meter according to certain embodiments of the invention.
Figure 6:
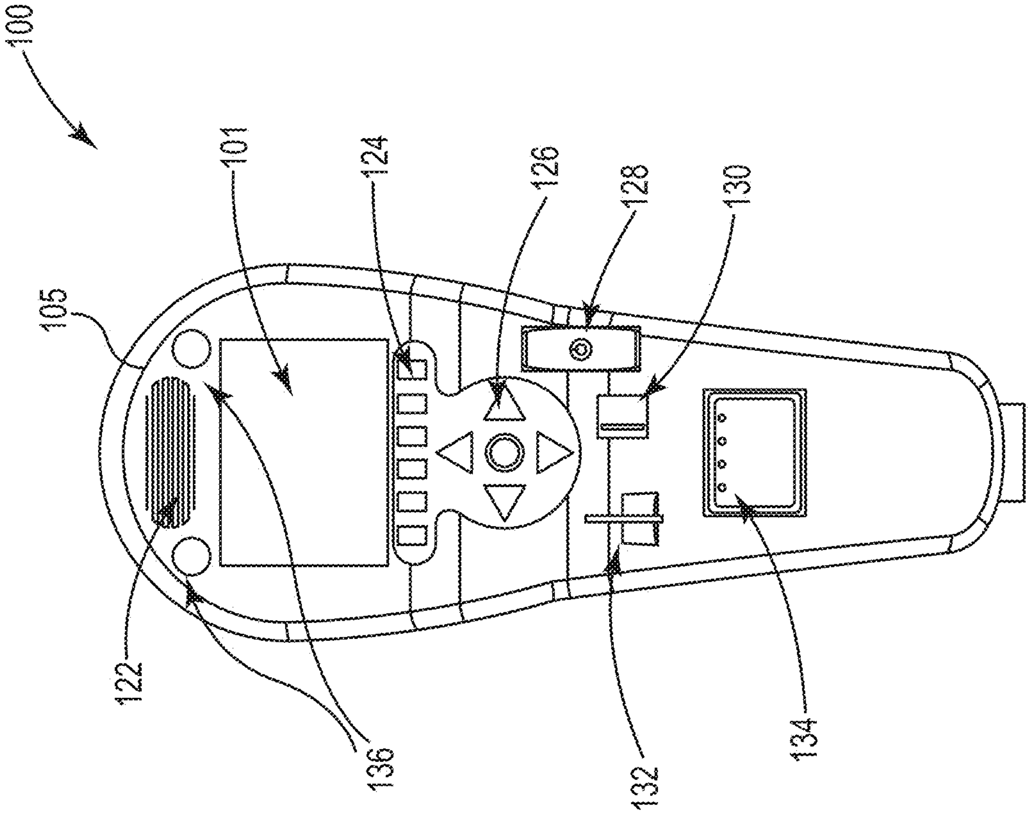
FIG. 6 is a front view of a parking meter according to certain embodiments of the invention.

Referring now to FIGS. 4-9, a first example embodiment of a meter is shown. The meter includes an outer housing 105 or enclosure that houses and protects the various components of the meter. The housing 105 is moisture and impact resistant since it is exposed to rain, snow and other elements. Also, light impacts to the housing may be delivered by people and objects, so the enclosure is generally formed of rugged materials such as metals or impact resistant plastics. Example dimensions are indicated in FIGS. 4-5, but the dimensions can be altered without departing from the scope of the invention unless specifically recited in a given claim.

The meter enclosure 105 includes on a first or front side a microphone, speaker and camera interface area 122 so that the user can interact with the meter and/or operator/concierge/other person via words and/or images. Images are displayed to the user via screen 101. The screen 101 can be touch-responsive (capacitive, pressure sensitive, etc.) and include a plurality of soft buttons 124 displayed on the screen so that the user can select various options, services and retrieve data. Hard navigation buttons 126 can be provided in addition to, or in the alternative to, the screen being touch sensitive. For example, a "home" button and a "back" button can be provided.

The housing internal components can be accessed via t-handle 128 with integral lock.

Both coin slot 130 and credit card reader 132 are defined in the housing for payment acceptance. Additionally, a contactless payment region 134 can be defined on the meter for payment via NFC or other contactless payment means.

A plurality of status lights 136 are also defined in the meter. At least one light corresponds to a respective parking space and can use color coding to quickly indicate status to the user. For example, green color can be designated as being within the prepaid parking time, yellow to designate grace period and/or prepaid parking time about to expire, and red to designate a violation has occurred. The colors can be varied, increased in number, and also flashing modes incorporated, to convey additional levels of urgency and status to the user.

Figure 7:
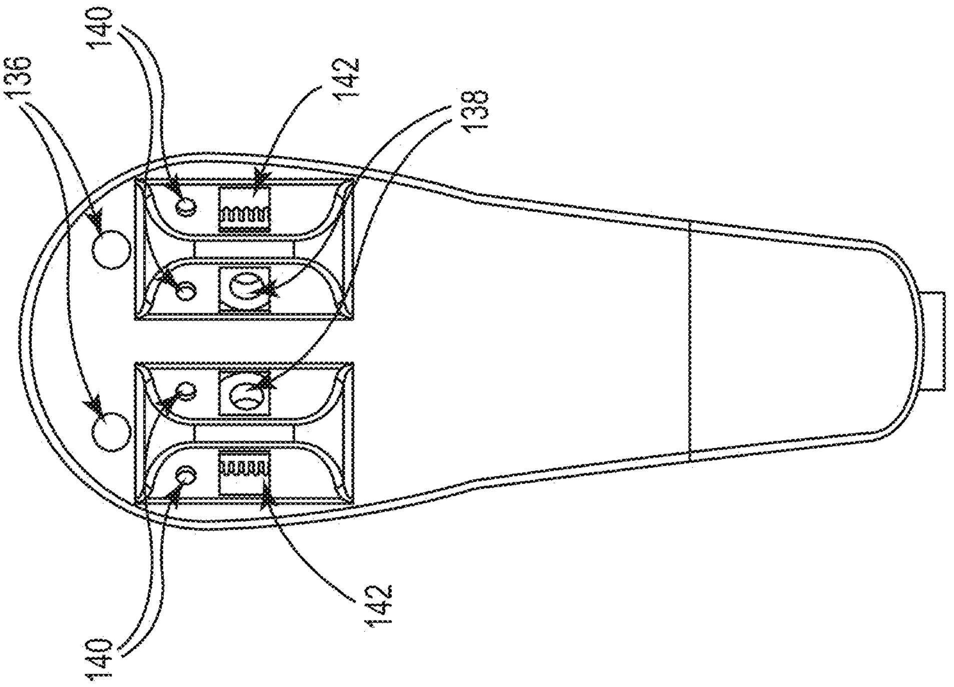
FIG. 7 is a back view of a parking meter according to certain embodiments of the invention.

Referring now to the opposing, or back/rear, side of the meter housing in FIG. 7, additional features are shown. It should be noted that the front/back are relative terms and are used here merely for convenience and clarity of the disclosure. The status lights 136 are repeated on this side of the meter for enhanced visibility. The camera outlets 138 are shown adjacent to one another. In this illustration, the cameras are arranged in a side-by-side configuration with protruding housings so that the viewing angle corresponds to a respective parking spot. However, the cameras can be arranged in an over-under stacked configuration instead of the side-by-side configuration shown. The vertically stacked configuration allows for a slimmer width of the meter and also reduces likelihood of blocking the adjacent camera due to the distance that a camera housing projects outward from the side of the meter side surface. Additionally, the cameras can be recessed into the housing to achieve the desired viewing angle versus protruding as shown in FIG. 7.

An ultra-sonic sensor 140 is provided corresponding to each parking space being monitored by the meter. The sensors are used to determine the presence/absence of a vehicle in the respective space. It should be understood that alternative occupancy monitoring means discussed herein can be employed in alternative embodiments.

Infrared (IR) lights 142 are also provided corresponding to each monitored parking space. The IR lights 142 illuminate the vehicle's license plate to allow the plate to be better photographed compared to merely using ambient light.

Figure 8:
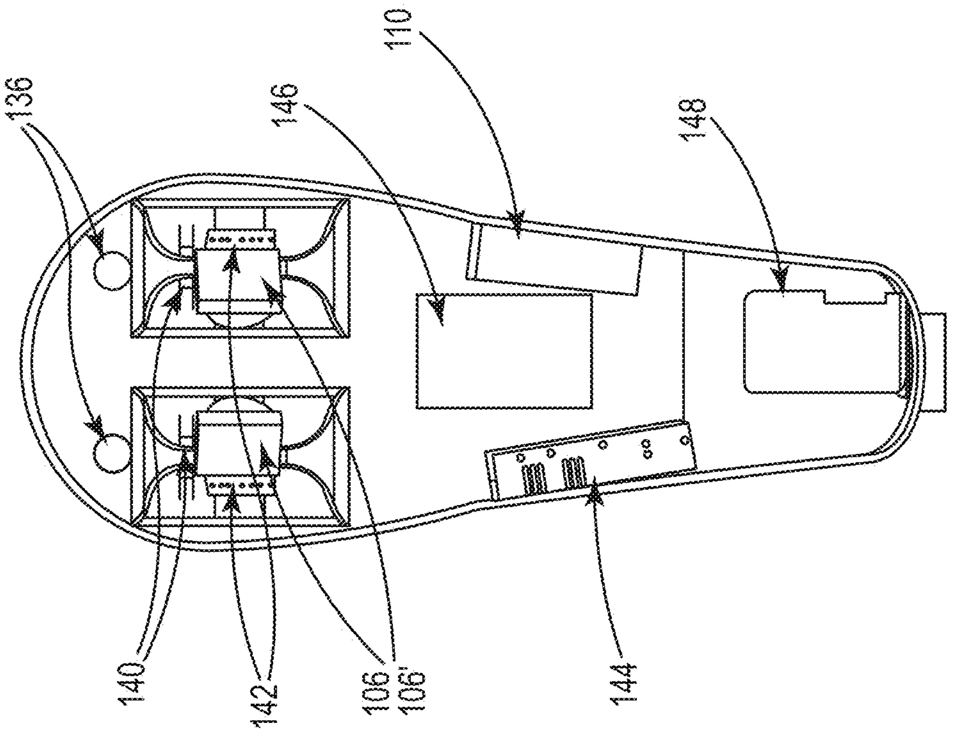
FIG. 8 is an internal component view of a parking meter according to certain embodiments of the invention.

FIG. 8 illustrates the meter with the front half of the housing removed. The status lights 136, IR lights 142, vehicle sensors 140 and cameras 106, 106' can be seen. In addition, the microprocessor or CPU 110 is shown, along with a power supply 144 and internet gateway interface component 146.

Figure 9:
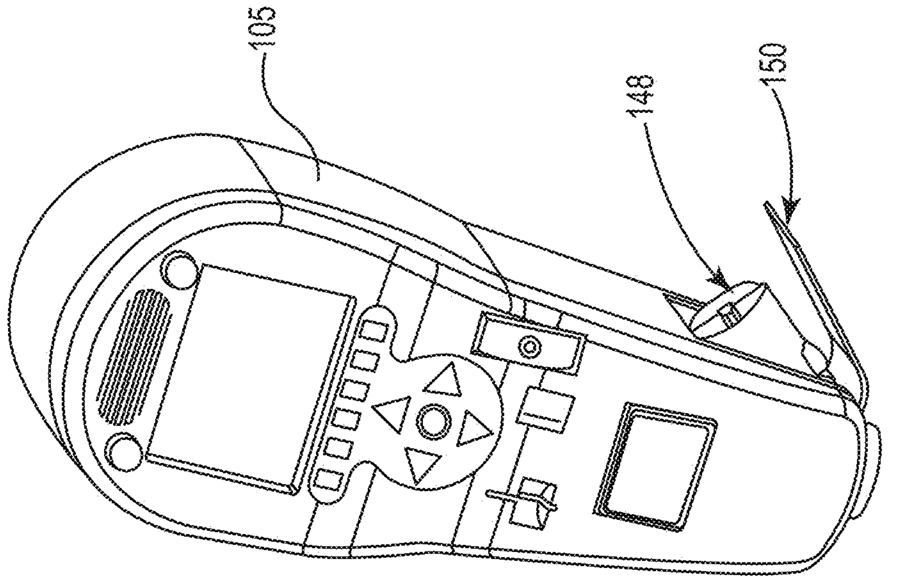
FIG. 9 is a perspective view of a parking meter according to certain embodiments of the invention.

Referring to FIGS. 8-9, a standardized coin can (tall or short) 148 securely resides in the enclosure 105 behind a coin door 150. The door allows access to the coin can without opening the enclosure 105. Locating the door 150 on the side of the meter increases the available useful surface area on the front and back sides of the meter. However, front and rear-located coin doors are within the scope of the invention unless location is specifically recited in the claim. The coin can 148, door 150 and coin slot 130 can be eliminated if it is desired to preclude payment via coins.

Figure 10:
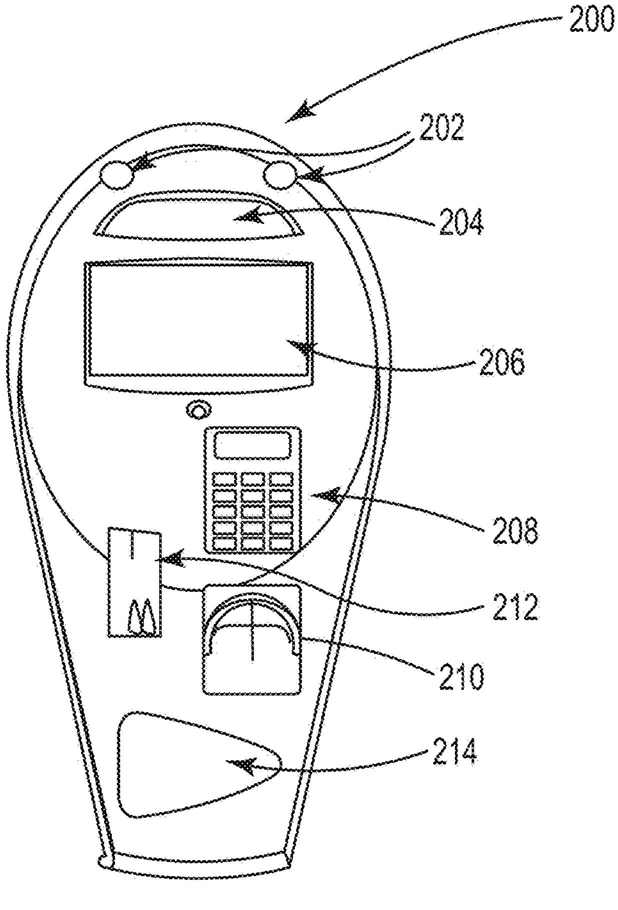
FIG. 10 is a front view of a parking meter according to certain embodiments of the invention.
Figure 11:
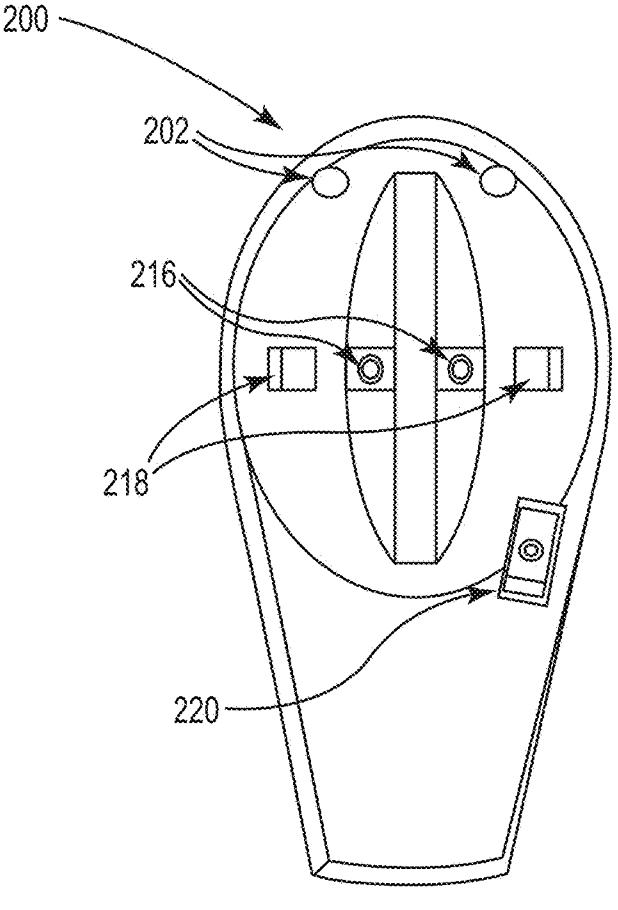
FIG. 11 is a rear view of a parking meter according to certain embodiments of the invention.

FIGS. 10-11 show an alternative embodiment of the parking meter according to certain aspects of the invention. The meter 200 includes one or more status and violation indicator lights 202 (on front, back or both). A front facing camera 204 is disposed in the meter housing along with a microphone and speaker to provide two-way communication. The front side is provided with a touch responsive screen (GUI) 206. A physical key pad 208 can also be included in the housing. The key pad 208 can be in the traditional phone numeral/alpha layout, or in another desired configuration. Alternatively a touch pad, joystick or other input means can be included in the meter in addition to, or instead of the key pad 208 and/or the touch-responsive screen.

A card reader 210 is included in the meter and arranged to be operable from the front side. A traditional coin slot 212 can also be provided. Further, a near field communication (NFC) reader 214 assembly is disposed in the meter housing on the front side to facilitate payment via NFC.

It can be seen from the rear side of the meter that the meter housing includes dual wide angle cameras 216 to capture images/video for two adjacent parking spots. An illumination light (e.g. white light emitting diode) 218 is provided adjacent each camera to provide adequate illumination of the vehicle plate or other intended imaging target.

The coin vault or lockbox is maintained securely inside of the meter housing, but can be accessed via key lock 220 on the rear side of the housing.

The meter 200 further includes a microprocessor and non-transitive physical memory. The memory contains software code that the processor executes to control operation of the meter. The same memory can also store the image/video/audio captured by the meter's cameras and microphone, or such information can be stored in a separate physical memory in the meter, or the image/video information can be transmitted to a remote location for storage, or any combination of the foregoing.

The meter can contain software code executable by the processor to facilitate recognition of voice commands issued by an operator (customer) that are picked up by the meter's microphone. This may be the preferred means of input to the meter by some users, including persons having visual impairment.

The parking meter disclosed herein is an intelligent, self-contained computer-controlled device that, in certain embodiments, is linked to a broader security network via a high-speed internet connection as a stealthy surveillance system. It has extensive data gathering capabilities given its three cameras, LPR feature, a speaker, microphone, and touch screen.

Data, including the time of stay of a vehicle in a given space can be monitored and stored in a central database.

The cameras can be high-definition cameras, used to capture images and video. In one example usage, meters are placed about every forty feet along a street. The two street-facing cameras on the back of the meter head are furnished with wide-angle lenses that allow them to capture a broad field of view. Thus, all street activity can be captured, including vehicles, crowds, faces in crowds, suspicious objects and banned substances. While the street-facing cameras are recording street activity, the front-facing cameras are trained on the sidewalk adjacent the cameras to capture activity occurring on the sidewalk. Images can be used by law enforcement with vehicle and facial recognition applications to search for persons of interest and determine location and stealthily monitor such persons. Alternatively, when a face match is found a notification can be sent out and/or alarm triggered.

Moreover, the captured license plate images can be converted to text as discussed previously and compared to a database of known plate numbers flagged for outstanding parking violations, criminal records, amber alerts, stolen cars, fugitives or terrorists, etc. The surveillance system thus automatically initiates notifications and appropriate response actions when a match is found. For example, the responses can include automatically generating a citation, notifying a police officer, summoning appropriate law enforcement, summoning firefighting personnel, or calling a tow truck.

The indicator lights 202 in one embodiment are red, and light up when the vehicle parked in the space is in violation. Additional lights and/or multicolored lights can also be included to enhance the visual cues to users and potential users as discussed previously. For example, a green light can be lit when the meter is available. This aids persons in looking for available spots. An amber or yellow light can be used to indicate that the parking time will expire soon or that a grace period is in effect. The lights can also be flashed to convey additional information as may be desired. Corresponding explanatory messages are preferably simultaneously displayed on the meter's screen 206.

In one embodiment, the touch screen 206 is an 8-inch high-definition, color touch screen. The customer interacts with the touch screen to select parking options and enter payment information. The display can also be commanded remotely via the back office server to broadcast emergency messages, instructions or warnings. For example, a tornado warning, weather warnings, amber alerts, and other public broadcast notifications. Community information can also be displayed. Paid advertising can be displayed. Maps can be posted. The user can also be requested to respond to a poll. The user can also download certain information via the meter such as directions, directories, weather, and personal account information, access permitted Internet sites, call for help, report a crime, place a VOIP call or videoconference, purchase tickets, purchase passes, etc. Additional features and functions are discusses throughout this specification. The meter thus functions as a government-connected community kiosk or portal.

A biometric identification means such as a finger print scanner, iris scanner or other biometric identification mechanism can be provided to the meter in alternative embodiments. The biometric identification means can associate an individual's identification (if registered with the control computer) with a given account or form of payment.

Figure 12:
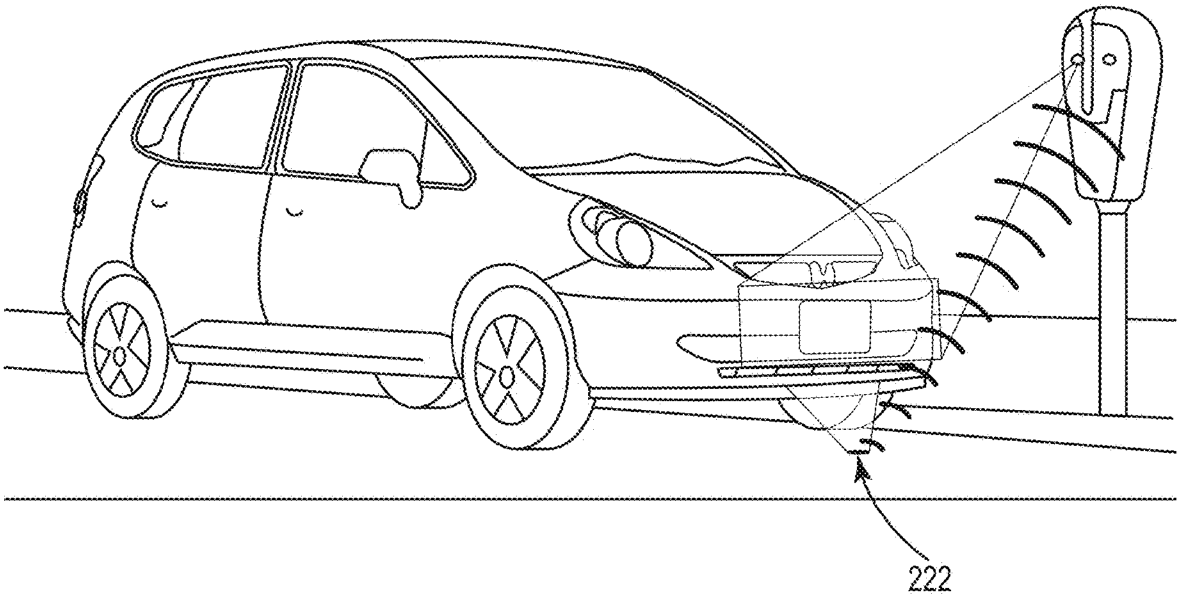
FIG. 12 is a perspective view of a parking meter and road sensor according to certain embodiments of the invention.

Referring to FIG. 12, the meter is shown in operation when combined with an in-ground vehicle sensor 222. The sensor 222 detects a vehicle's arrival and departure and the meter's corresponding camera captures photo evidence of the car's license plate. The vehicle sensor can also be incorporated into the meter housing or the camera can be used to detect vehicle presence. The sensor 222 uses radar, laser, acoustic, motion sensor, or other suitable sensor mechanism to determine the presence of the vehicle. The sensors can be either hard wired for power or be battery operated. Use of low-power communications protocols such as Bluetooth to communicate with the corresponding meter would provide a useful life of approximately five years before replacement is required.

Figure 13:
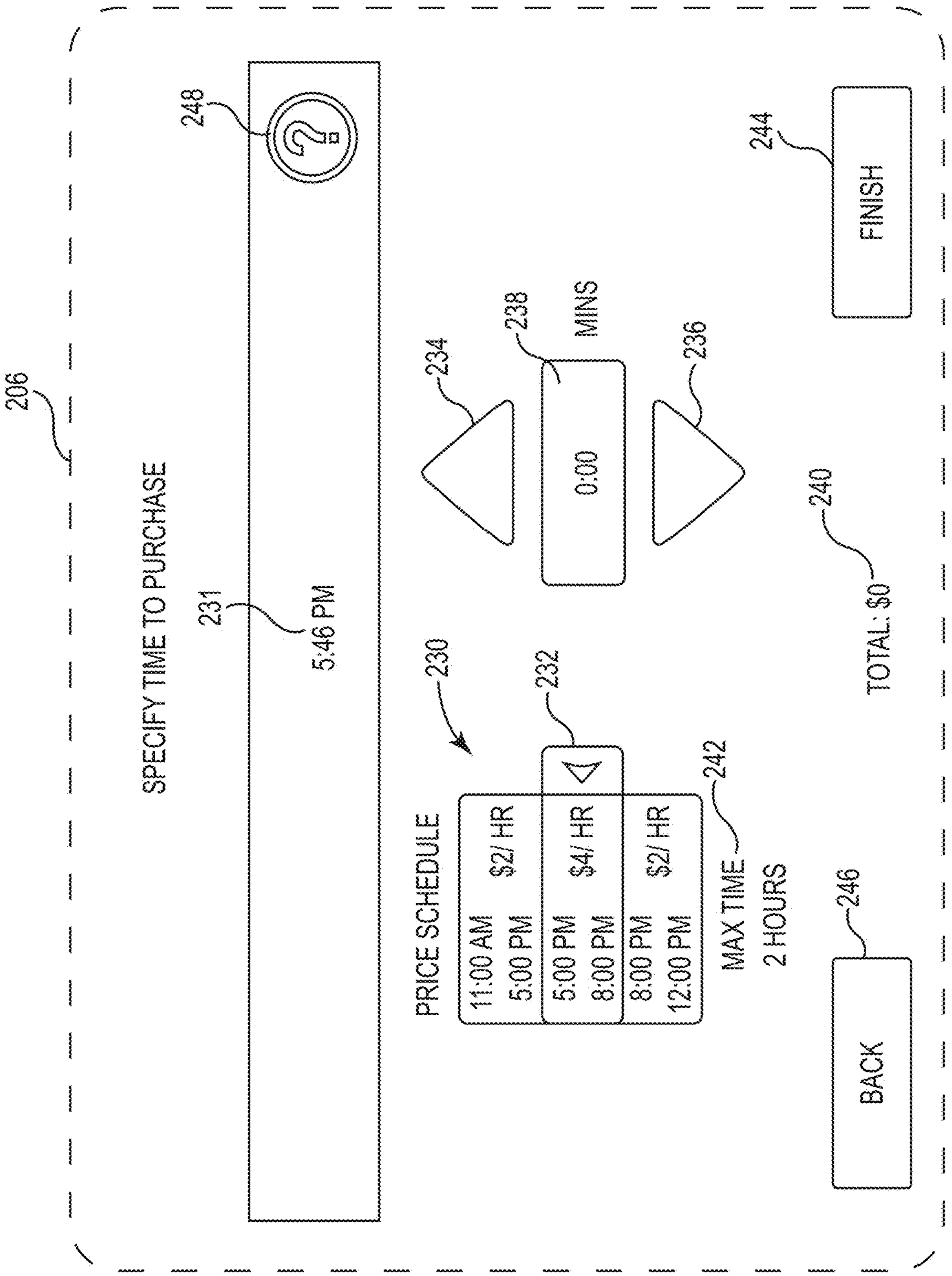
FIG. 13 is a screen shot of a parking meter interactive display screen according to certain embodiments of the invention.

Referring to FIG. 13, a screen shot of the interactive display screen for a parking meter is shown according to certain embodiments. The touch screen 206 is displaying a screen for the customer user to select a desired amount parking time prior to submission of payment for the selected time duration. The screen displays a price schedule 230 to advise the user of the applicable pricing for parking in the spot corresponding to the meter. Note that the price schedule indicates variable pricing depending on the specific time of day. For example, between the periods of 5:00 μm and 8:00 μm, the price is $4 per hour. Otherwise it is $2 per hour. The portion of the price schedule applicable to the individual user is designated by highlighting the schedule corresponding to the current time of day 231 (5:46 μm in this example) with an indicator 232 and/or highlighted or alternate color text. The gradations of time for the price schedule 230 can be finer or coarser without departing from the scope of the invention.

The user presses the virtual up 234 and down 236 buttons on the screen to increment the amount of desired parking time. A digital time display 238 located between these buttons clearly indicates to the user the amount of selected time. A corresponding dollar total 240 is also displayed adjacent to the time selection portion of the screen. A maximum park time 242 is also displayed to advise the user of such limitation.

As the user increments/de-increments the amount of parking time until the desired amount of time is reached or the maximum time permitted is reached. The indicator 232 widens to reflect the selected amount of time. This also visually cues the user in the event that their incrementation of time has crossed into a different pricing tier. Once the user has finished selecting the time amount, they press the virtual "finish" button 244 on the screen, which will take them to a payment screen. At any time, the user can press the virtual "back" button 246 to return to the previous screen. The user may also select the virtual "help" button 248 to obtain further instructions and/or access a live service person.

Figure 14:
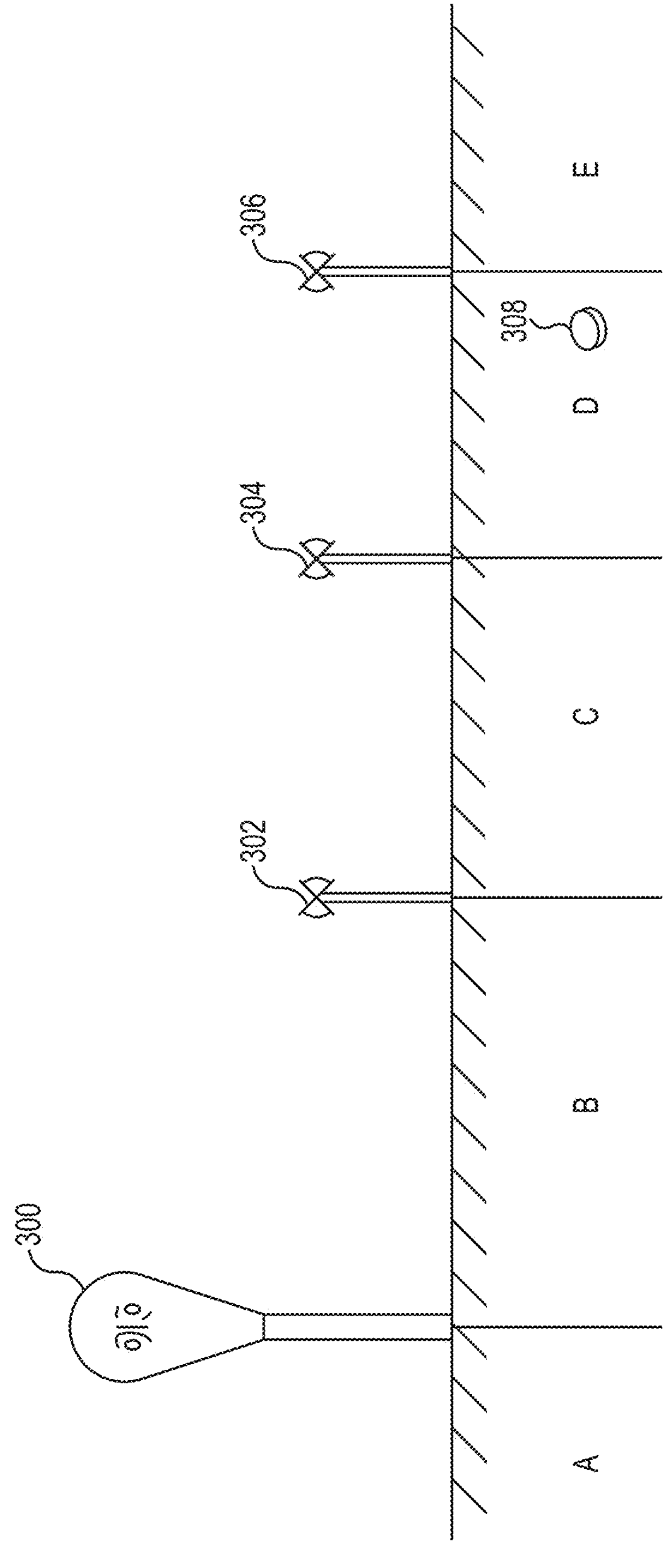
FIG. 14 is a side view of a parking meter system according to certain embodiments of the invention.

Referring to FIG. 14, an alternative parking meter system is shown. A kiosk or master parking meter 300 like that discussed herein is disposed on a pole on the side of street adjacent two parking spaces (labeled here as A and B). Rather than place additional meters adjacent the remaining spots for this street segment, a dual lens camera 302, 304 and 306 is disposed on a pole so that images of the vehicles license plate/tag in spots B, C, D and E can be acquired. The cameras 302, 304 and 306 adjacent spots B, C, D and E in this illustration then communicate with meter 300 wirelessly or via wired communications conduit so that the meter 300 can function as a monitoring and payment kiosk for the cameras 302, 304 and 306 over a local area network.

The user interaction with the kiosk meter 300 is the same as described above, but with the additional step of the use inputting or selecting the space corresponding to the user's vehicle. This can be provided in numerous ways, such as by labeling the spots on the pavement and/or by marker poles, by asking the user to input their license plate number, or by asking the user to select their license plate number from the display showing all of the plates in the spots that the meter corresponds to in the local area network.

In a further alternative, the cameras on poles 302, 304 and 306 can be replaced with a camera embedded in the roadway 308 in each of spots B-E. The camera is disposed in an impact resistant plastic or crystal material so that it can be driven over while maintaining aim at the vehicle's tag/plate. A fish-eye lens configuration can be defined in the cameral housing to expand the viewable area of the roadway camera 308. As with the pole-mounted cameras, the roadway cameras 308 communicate wirelessly or via wired connection to the kiosk meter 300. The roadway cameras 308 can be powered by an internal battery and communication via wireless means so that installation is made easier since no wires need to be connected for power or communications. The cameras 308 "sleep" until woken for transmission and imaging duties. The sleep cycles are triggered by internal timers or by a wake signal sent via the kiosk meter 300. Thus battery power can be conserved.

The "wireless" communication between the remote cameras 302, 304 and 306 and the kiosk meter 300 can be via any conventional wireless protocol, including Bluetooth, Wi-Fi, NFC, cellular, etc.

As an alternative to a patron entering their license plate number, the patron could enter a space identification in the kiosk corresponding to the particular spot in which they parked. This will be possible when the camera can track the vehicle to a specific spot and associate the vehicle ID in memory as corresponding to the specific spot. The spot identification can be provided in numerous ways, including numbers on the pavement, numbers on a raised placard and/or a scannable (e.g. QRS code) provided to the spot that can be scanned by the patron's Smartphone.

If a scannable feature is provided then the user can use an application on their Smartphone to add time, purchase passes or permits, find open spots, reserve spots, etc.

Figure 15:
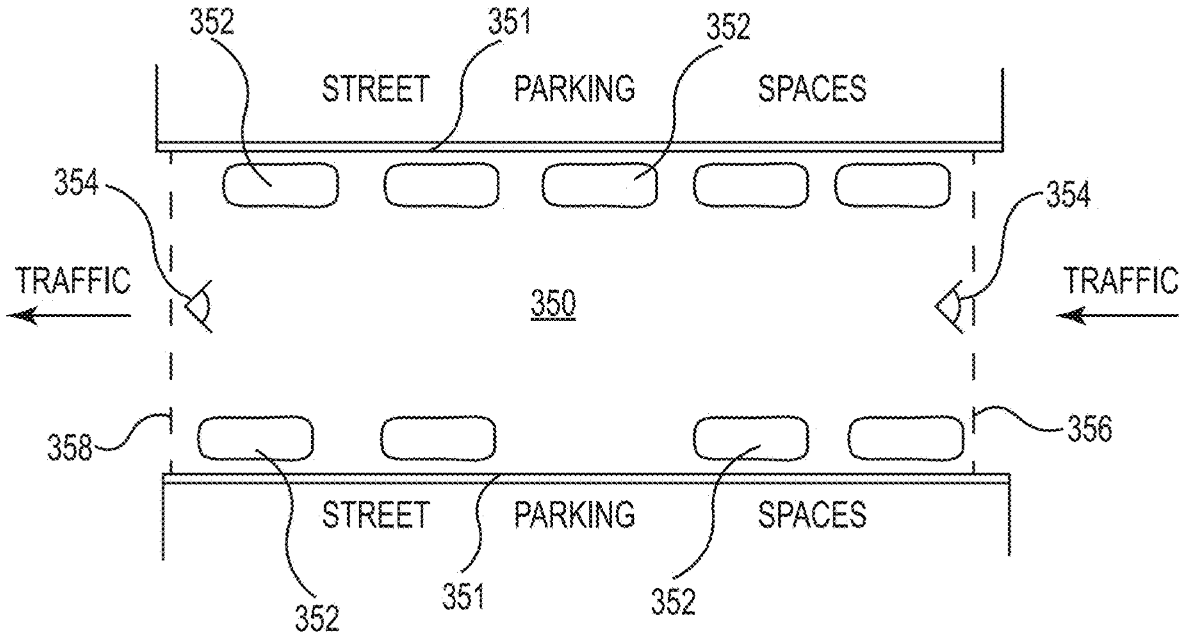
FIG. 15 is a diagram of a parking meter system according to certain embodiments of the invention.

Referring now to FIG. 15, a system for managing parking on a street 350 using a minimal number of meters is shown. A plurality of parking spaces 352 are defined longitudinally along the opposing curbs 351 on a section of a street 350. The depicted street is for one-way traffic, but this embodiment is adaptable to two-way traffic as well.

A license plate recognition (LPR) enabled camera 354 is mounted on a structure across each of the entrance 356 and exit 358 of the defined street portion, thereby defining a monitoring system. The monitoring system reads the plates of each vehicle passing within the camera's view and reports the data to the control computer. This arrangement permits the parking system to count cars, identify cars specifically, and determine just how long each car has dwelled on that street. Dwell time on the street is determined for a car to drop off or pick up passengers or goods and then it is determined if the car was parked and for how long, whether it was double parked—for how long—and provides the added security features in the above embodiments.

Where there are other exits, or parking lots along the same street, additional cameras can be mounted in positions to determine if these vehicles should be excluded from the parking charges or any violations.

This embodiment can be used to totally eliminate the need for meters on those streets where this would be applied and effective. Users could be permitted through preregistration to park for pre-assigned periods, with or without parking charges as the permit allows.

Figure 16:
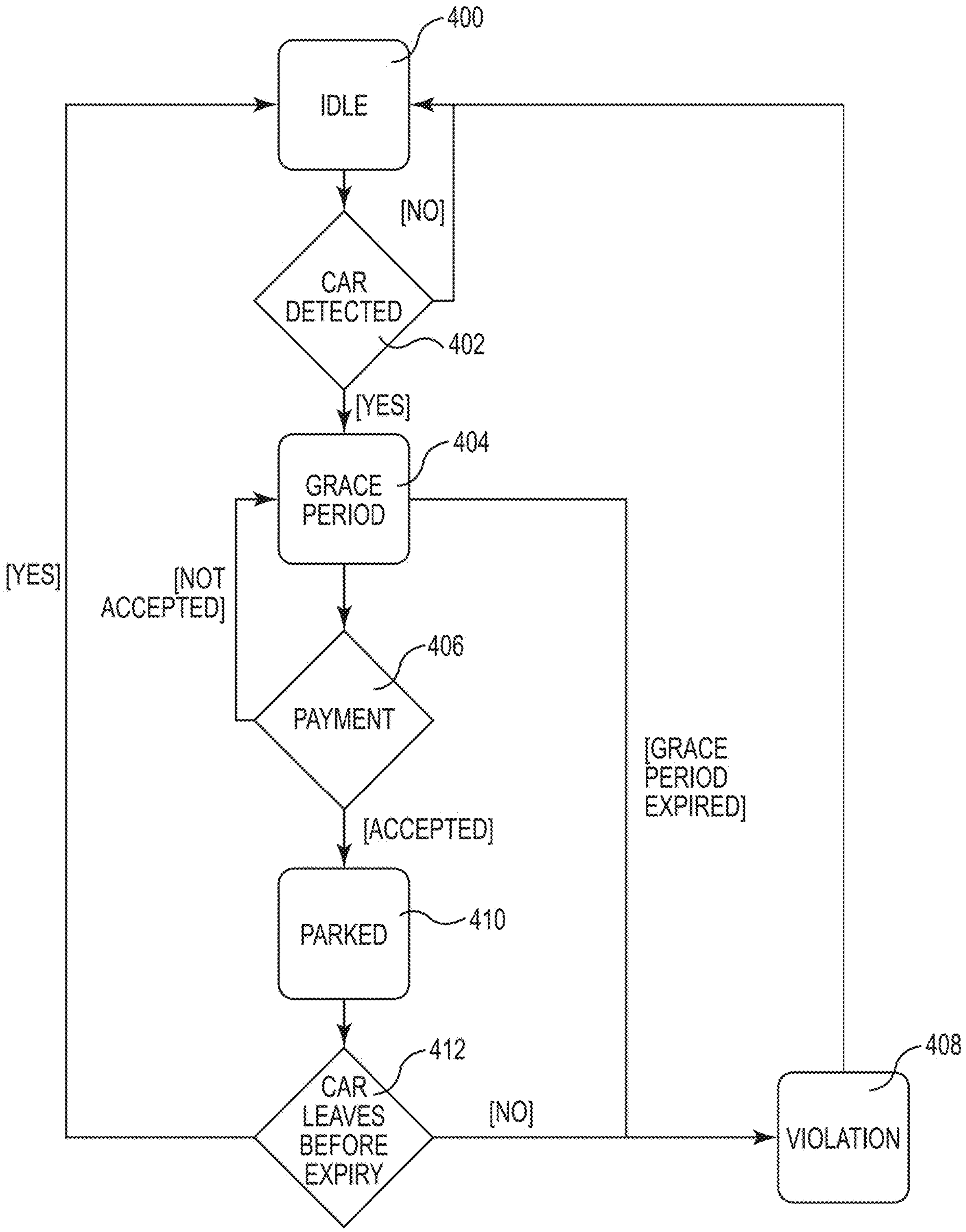
FIG. 16 is a block diagram of the operation of a parking meter according to certain embodiments of the invention.

Referring to FIG. 16, in use, the parking meter according to certain embodiments is in the default idle state 400. The meter periodically queries the vehicle sensor to determine whether a vehicle is present 402. If no vehicle present, then the meter remains in the idle state and continues its queries.

Once a vehicle is detected via the query 402, the meter goes into the active state and begins timing a grace period 404 with the internal timer as discussed previously. The grace period (e.g. 5 minutes) allows the vehicle's operator a reasonable time to interact with the corresponding parking meter before a violation is determined. The grace period 404 accrues until payment is received 406 or the grace period times out, in which case a violation is determined to have occurred 408.

The payment block 406 includes the driver selecting the desired amount of parking time or paying the fixed fee, as applicable. A parking space or license is also selected where necessary. Once payment is accepted, the parking period 410 begins.

The parking period 410 counts down the time that the user has pre-purchased until the vehicle exits the space 412 or the purchased parking time expires, which results in a violation 408. While the parking time is counting down, the meter continues to query the vehicle sensor to determine whether and when the vehicle has left the space.

The driver can also be provided with a grace period at the end of the purchased parking period. The driver's card can optionally be validated or charged a fixed fee to ensure that it is valid, and then charged an additional fee for any time spent past the pre-paid time.

The microcontroller (processor or microprocessor) commands the camera to capture an image of the vehicle license plate (or other identification information) as the vehicle enters the associated spot. The license plate image can also be captured again at the time the vehicle exits the space and/or at the time a violation 408 is determined to have occurred, or both. Images and/or video of the entire parking event (from entrance to exit of the parking space) can be captured, stored in memory and/or transmitted to the central computer system for any of the cameras coupled to the microcontroller.

Each camera can be individually commanded via the central computer to allow remote viewing of each camera's feed via authorized phone, tablet, or computer for lawful surveillance and security. Thus, for example, law enforcement agencies can be provided with a network of street-level cameras at approximately adult-chest-height or eye-height through which surveillance and security can be conducted.

A violation timer can also be initiated at the time a violation occurs 408 in order to determine the duration of a violation. This latter information can be used to determine escalating violation penalties, if desired by the municipality. A violation can also be reported to law enforcement authorities at the time it occurs, or once the violation endures for a set period of time (e.g. 24 hours).

In a "no parking" mode, such as during declared snow emergencies, by police order, or other temporary no parking circumstance, the meter will query the spot for the presence of a vehicle 402 and immediately determine that a violation has occurred 408 upon the vehicle's entry in the spot, or after a grace period has occurred 404.

Violations are determined in one embodiment by the timer algorithms programmed into the meter's microprocessor 110 or into the central control computer 120 that is part of the LAN or into a control computer 120 that is in communication with the meter via the internet.

A driver can also purchase violation insurance at the time of initial parking purchase 406. When a user selects and pays for the insurance option, the meter will automatically "feed" itself until the maximum allowable time is reached, by debiting the appropriate amount on the user's credit card.

A driver whose vehicle has been determined to be in violation 408 can be provided with a violation notice at the time that the driver interacts with the meter for a second time. In such circumstance, the driver can be presented with the option to acknowledge their violation and make corresponding payment via the meter. This feature makes for efficient violations collections. As an enticement, the driver in violation can optionally be provided with a discounted violation fee or fine if they pay immediately at the meter.

In a further embodiment, a vehicle whose identification is known to have unpaid parking or other violations can be denied parking services by matching the vehicle's identification information with a black list of banned vehicles. In such embodiment, the vehicle ID is read at the time the car is detected 402. The ID is transmitted to the control computer 120, which then returns an indication of the vehicle's status on the black list. The driver could then be provided with an opportunity to pay those past violations at the meter to obtain parking clearance, in addition to any parking fee for the present parking event.

The feature of each parking meter being in communication with a central control computer (also referred to herein as a back office server) allows for the easy changing of parking rates and parameters for different times of day and for events. For example, parking rates during the work day can be charged at a higher hourly rate with a smaller maximum time limit compared to hourly parking rates and time limits in the evening. Grace periods can be changed and modified depending on time of day. No parking modes can be set. Meters in certain locations can have their rates changed to manage supply and demand for spaces in a given area. Also, the rates during events, such as concerts and sporting events, can be significantly increased and the duration can be changed to correspond to the event duration. This allows the municipality to optimize revenue potential of their meters. And the changes can be programmed via the central control computer to occur automatically or the changes can be entered manually via the central control computer and pushed to the target meters where the change is desired.

According to an additional aspect, a user can establish an account with the municipality (or its private contracted designee) to deposit a positive balance in a driver's account. Then the driver can be given a proximity card that can be read with a proximity card reader included in the meter. The driver's account is then debited an amount corresponding to the duration of parking. The driver would thus not need to interact with the meter at all unless a violation occurred. However, the driver's car license plate would continue to be imaged when the vehicle entered and exited a given parking space. The driver would be found in violation if their corresponding account balance dropped below zero. Alternatively, the license plate could be associated with the account, and any parking fee automatically deducted from the corresponding account. Thus, the driver would not need to interact with the meter at all.

Each meter connected to the central control computer 120 continually reports its status as being occupied or unoccupied. This allows for analysis to be performed for a variety of reasons, such as price adjustments, traffic analysis, urban planning, etc.

The meter status data in an additional embodiment can be accessed by members of the public through a public interface in order to find a meter location corresponding to an available parking spot. A smartphone application can be provided that accesses the geographic location information of meters with open parking spaces and present the driver with map application data (e.g. Google Maps or similar) so that the driver can quickly and easily find an available parking spot.

The central computer can also push coupons and ads to the driver's smartphone by sending the coupon data to the corresponding meter for transmission to the user's phone. Alternatively, the meter can transmit the coupons without need to communicate with the central computer.

The specific coupons and ads pushed can correspond to the specific geographic location that the driver has parked and/or based upon the type of vehicle parked in the space. This allows local merchants to pay for territorial scope in which their ads/coupons are distributed, and be charged accordingly for such distribution. Also the driver can be served with ads and coupons targeted to their particular demographic. Each meter can display ads on the meter's GUI for the driver to receive in a similar matter. The user can alternatively obtain coupons via the meter through NFC protocols. The coupons can be targeted to the driver based upon demographics, including geography, car type, parking frequency and other data corresponding to the owner of the vehicle.

In certain arrangements, each parking space is monitored by an associated camera and one master meter interacts with multiple separate cameras. In this embodiment, at least one of the camera units is separate from the parking meter. Each camera unit can communicate with its respective master parking meter to be controlled by that meter. This embodiment allows for the use of fewer costly parking meters by having a single meter interact with multiple cameras that monitor a plurality of parking spaces.

License plate (or other vehicle ID) information for automobiles parking in the monitored spaces can be transmitted to law enforcement authorities upon the vehicle entering and leaving the space. This information can be useful for a variety of reasons, including tracking suspected criminals or monitoring suspicious activity. For example, a particular vehicle may be associated with a person of interest to law enforcement authorities and such authorities may be able to track and determine the whereabouts of such person from the monitored vehicle ID information.

In addition to the automatic collection of vehicle ID data as described above, the meter can be actively commanded remotely to perform surveillance. This can include being remotely activated to obtain pictures and video via the cameras. The cameras can also be remotely aimed if so configured. For example, a law enforcement agency can interface, via the central computer or the corresponding LAN, with one or more meters to selectively activate the camera(s) to acquire pictures and/or video.

The cameras in the meters can further be configured and used to perform facial recognition of the user, of passersby, or of any selected person within the cameras effective field of view.

The meters can also include a microphone for voice capture and a speaker for audio transmission. Audio data can thus also be recorded both passively and actively as described for video/pictures herein. The audio capability further permits the user to selectively communicate with a concierge, with law enforcement authorities, with medical professionals, with towing services, with a help desk and also make calls (using the voice over internet protocol) to anyone of the user's choice. The user can also make two-way video conference calls using the meter's camera, microphone and speaker.

Any number of additional sensors may be deployed here to listen, see, and interact with the meter's environment and to provide data and intelligence to the community, including beaconing technology that permits smart phone interaction and data exchange automatically for real time user-to-meter alerts and information exchanges.

If the vehicle's license plate cannot be read when the vehicle enters a monitored spot, the meter display will request the driver to enter their vehicle ID information and will associate said ID with the image of the vehicle obtained when the vehicle enters and leaves the space. If the driver fails to enter the vehicle ID information, then a violation notice is given and law enforcement authorities are summoned. The meter can also notify an officer to manually spot check the vehicle to validate whether parking privileges are being abused; for example to verify a user who selects the handicap button. Additionally, a parking enforcement officer or other official can validate certain parking events remotely by manually reviewing photos of the license plate from a network-enabled device.

The meters are configured to monitor their functionality and report status to the control computer at regular intervals. For example, the microprocessor can be configured to run a self-diagnostic once per day (or other selected interval) and then report the results to the central control computer. Users can also report errors through the GUI and the meter can also self-report errors encountered during operation. The control computer can then use this information to automatically dispatch service personnel to meters that report errors or that have failed to report at the expected time. A meter that has not communicated with the control computer within a specified time will be reported as in need of service automatically by the control computer.

A further feature of certain embodiments is the ability of user to charge vehicles equipped with electric storage capability (e.g. batteries) via interface with the meter while parked in the corresponding spot. In such embodiment, the meter or other corresponding structure is equipped with a charging port and electricity supply configured to allow the user to plug in their vehicle for recharging. The meter can be configured to allow user to purchase the electricity, if desired by the municipality supplying the electricity, with payment made via the meter's user interface and any of the payment means described herein.

It is also to be understood that when the act of taking a picture is referenced, that this can include taking a plurality of pictures or video as part of a given picture taking action. The images taken by the camera(s) are digitally coded with date, time, camera number, meter number, and space number. The camera(s) can be provided with flash (e.g. LED flash) and light sensor components to achieve desired image quality. An accelerometer can be included in the meter in order to provide for impact detection.

The meter can be programmed to make video or audio calls through its user interface and internet connectivity. In particular, the meter can provide a quick link to call emergency services (e.g. 911) with a single touch. A videoconference link can be established with emergency services as well. Additional call options can be included, such as concierge services, 311 services/reporting, roadside assistance and calls to any individual number the customer wishes to enter. Other video conference, voice-over-IP services and instant messaging clients can further be programmed to be accessible via the meter. A web browser can also be provided. The user can access direction information (e.g. current location, directions to a destination, nearby points of interest, etc.) through a custom directions menu or via the internet (e.g. Google Maps). The user can further access weather information through a custom menu or via the internet.

The microphone provides the audio input for parking patrons who wish to talk with a customer service representative. They can also be remotely switched on continuously to listen for hostile foot traffic or gunfire and provide corresponding location information to the authorities. Speakers provide the audio output from the customer service representative on a call. They can also be used to broadcast informational or emergency messages from a command and control center.

The meter can also include an RFID (radio frequency identification) reader to pick up and track tags in addition to the NFC reader noted above that facilitates contactless payment.

A meter can be configured with progressive pricing rates, for example, $1 for the first hour, $2 for the second hour, $4 for the third hour, $8 for the fourth hour, etc. in order to encourage turnover of the space. Pricing can be dynamically altered based upon time of day, day of week or congestion levels as well. The congestion levels can be defined as a ratio of occupied spaces to available spaces in a given area, or it could be defined as a volume of traffic flowing on a given roadway. Both of the foregoing can be manually initiated or automated by the control computer respectively calculating the space utilization ratio and interfacing with traffic control systems that monitor traffic congestion or based upon insurance statistics regarding accidents, traffic, etc.

Every meter space can be selectably identified as a handicap space, snow emergency no parking, no parking, or other classification via central control.

The meter can also include a wireless transmitter/receiver antenna to permit the meter to operate as a Wi-Fi hot spot.

The screen can be programmed to present the user with advertising for local vendors and the ability to instantly receive coupons electronically on a smart phone. Display advertising can be delivered based on the type of car parked in the space, from license plate data, and/or other metric.

The meter can include a database of permit holders that are permitted to park for free or at a reduced rate. For example, a given class of person (e.g. municipal employees, handicapped individuals, neighborhood residents, senior citizens, military veterans, monthly parking pass holders, etc.) associated with a given vehicle's registration could be permitted to park for free at certain meters or during certain times of the day or be subject to reduced rates and fines everywhere or at certain meters. Residents of buildings and houses in a given neighborhood or area could be permitted to park free or pay reduced rates at meters in the vicinity to their residence address (and even on only certain days). This ability to designate multiple different class rules for parking authorization, parking parameters (e.g., grace period length and maximum parking time), corresponding rates (e.g., general, free and discount, etc.), corresponding fine rates, and even geographically customize certain privileges for individual vehicles is not possible with conventional parking meters and permitting schemes.

The meter can automatically recognize that a given vehicle belongs to a particular class based upon reading the vehicles license plate. Alternatively, a driver can enter a code, swipe a pass/voucher/card, or enter other identification at the meter that changes the parking class rules applicable to the instant parking occurrence. For example, to initiate the discount fee, the driver can manually type in a code at the meter, or the driver can use a credit card on file with the control computer that gives a discount, or the driver can use their cell phone to transmit a discount code to the meter, or the driver can use their phone to bump the discount code wirelessly to the meter, or the user could use a finger print scanner on the meter to identify themselves as a person entitled to a discount.

A merchant can establish a parking account associated with the control computer so that parking pass or discount codes can be distributed to customers, as desired, and then the corresponding merchant's account can be debited for the parking fee covered by the pass/discount. For example, a merchant may want to attract customers by offering to cover the cost of parking for any customer purchasing more than a certain dollar amount of goods from that merchant. Then the merchant can provide such qualifying customers with a one-time parking pass code to be entered at the meter when the customer returns to their car. By entering the code, the customer is credited back their pre-paid parking fee and the parking fee is deducted from the merchant's account.

In addition to discounting the cost to park, other parking parameters can be altered for certain individuals based upon their authorized class rules as noted above. These other parameters can be any operating parameter of the meter, including the cost of the fine free insurance, length of grace period, maximum parking time, immediate fine pay discount, etc. The code can also be used for certain authorized individuals, to allow parking at meters that are in a no parking condition. This latter example would allow the meter to be reserved by not permitting parking except for a recognized individual person or vehicle.

The customer can obtain event tickets or purchase other services (e.g. parking passes) through the meter interface and payment means. In such embodiment, the meter can function as a point of sale (POS) device for virtually any product or service, including payment of bills (e.g. water and electric bills), payment of parking fines or other fines, access to concierges, etc.

The meter's cameras can also be programmed to detect the expiration status of a vehicles ID plates or tags, and also issue a corresponding violation notice for expired status.

An inebriated driver can easily request a driving alternative, such as a cab, to get a ride home via the use interface of the meter. Additionally, a self-reporting "drunk button" on the meter's screen can be selected by the driver, which would pardon the driver from having to move their car while intoxicated as well as automatically calling the driver a sober cab. In this embodiment, the button on meter screen is easily accessible for impaired people in which the parking event can be lengthened or excused for a certain amount of time. The use of this feature can be tracked for each instance by associating it with a given license plate to ensure that the feature is not being overused. Such monitoring would also flag authorities if the button is pressed for vehicles bearing special status license plates, such as for repeat DUI offenders with so-called whiskey plates. A small fee could also be levied in the discretion of the municipality. Notification will be automatically sent to law enforcement if the drunk button is pressed and the car subsequently vacates the spot within a pre-defined a time interval.

If a driver with a handicap permit parks in a monitored space, the driver selects "Handicap" as an option through the GUI. The GUI shows a warning that a valid handicap plate or placard must be displayed. The system notifies the central control computer of the handicap selection. A list of license plates registered to handicap permit holders can be used to confirm permit usage, and flag non-corresponding vehicles for follow up by parking enforcement personnel. A registered license plate noted by the central control computer as that belonging to a handicap driver can eliminate the need to select the handicap option because the option will be set automatically.

Figure 17:
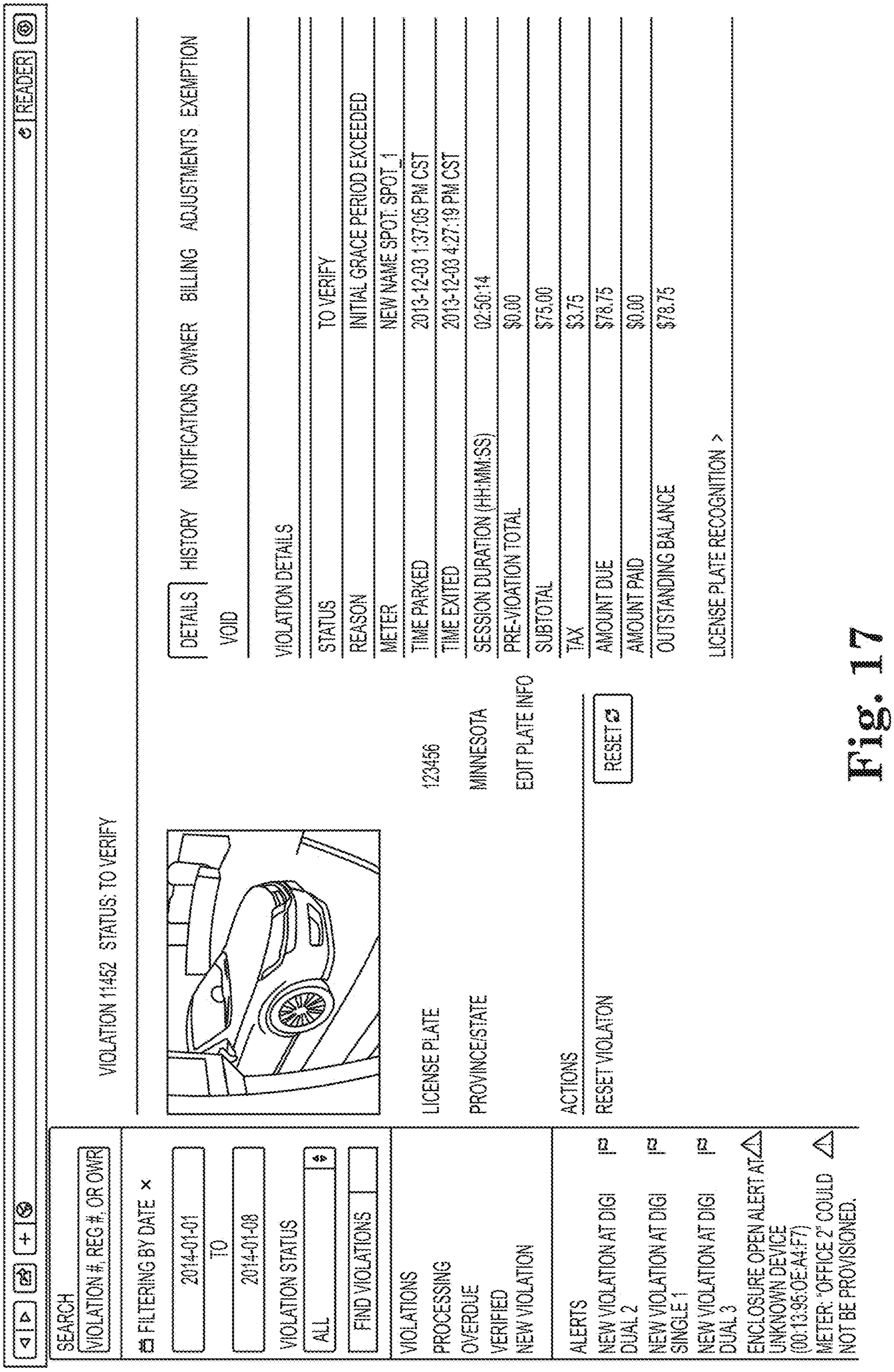
FIG. 17 is a violation report screen shot for a parking system according to certain embodiments of the invention.

When a violation is determined, the meter sends the photos and details of the violation to the control computer as shown in FIG. 17. The control computer informs the meter that a ticket has been issued and the meter turns on the violation light. When the violating driver approaches the meter display, the meter notifies the user that they have received a ticket. The meter offers a choice between an immediate discounted payment or future payment at full price. The user can choose to pay immediately at the discount, or to receive a violation sent to their mailing address associated with the vehicle registration.

As shown in FIG. 17, the Violation is assigned a violation number for tracking purposes. A picture of the vehicle and its license plate details and state of registration are indicated. Pertinent violation data such as the reasons or basis for finding a violation, time stamps, fine and payment are each provided. The plate information can be edited and the violation manually cleared in certain embodiments.

The meter can also be configured to allow for a predetermined and limited post-time expiration grace period make-up fee payment to avoid a violation. In such situation, the driver entered the space, paid for a fixed period of time, but did not pre-purchase fine-free insurance described previously, and then returned five minutes after the time expired. In such situation according to this feature, the user approaches the meter. The user selects his/her parking spot. The display shows a grace period notification for the user, notifying the user that they are five minutes late, if they pay for the extra time, they will not get a ticket. The user chooses to pay for the extra time. The user enters the vehicle and leaves. The system takes a photo of the car and license plate, including the time and details of the user's interaction with the system.

In another alternative scenario, the driver entered the space, paid for half a fixed period of time, paid for the fine-free insurance, and returned five minutes after the meter time expired. In this situation, the user approaches the meter. The meter displays a choice of spot. The user selects their parking spot. The meter shows that the credit card fine-free feature has charged their credit card for extra time to cover the overage. The user enters the vehicle and leaves. The meter takes a photo of the car and license plate, including the time and details of the user's interaction with the system.

The meter can be configured with a maximum parking time. The GUI will indicate to the driver the maximum time amount and will not allow the driver to select more time than permitted. If the vehicle remains parked in the spot for more than the maximum time, then a violation is automatically determined. The fine-free insurance and any port-expiration grace periods are inapplicable.

Once a vehicle departs a space, the meter transmits its empty status to the control computer, the meter is reset to zero minutes remaining and any violation status is removed.

The meter is also configured with a maintenance mode. This mode is initiated either by the control computer, by an attendant swiping an authorized "maintenance attendant" card, or by entering an assigned keypad combination. Once this mode is entered, the meter display shows a maintenance mode menu. The attendant chooses between "Cash out" and "Control Unit." The attendant enters a passcode. If the passcode is incorrect, the system notifies the control computer. If the passcode is repeatedly incorrect, it starts the system alarm. If the passcode is correct, the system disables internal alarms and transmits access notification to the control computer. When maintenance is complete, the meter exits maintenance mode. Alarms are reactivated. The meter notifies the control computer that it has returned to normal service mode.

If the meter receives an impact greater than a set threshold value as measured by an internal sensor, then the meter issues an alarm and notifies the control computer. The alarm is audible and visible. The alarm continues until the expiration of a predefined impact alarm duration.

If the meter enclosure is opened without prior entry of the proper credentials, then the meter issues an alarm and notifies the control computer.

Alarms can be manually or automatically deactivated by the control computer. An alarm can also be deactivated at the meter by entry of a corresponding code or entry of other credential. If the alarm is interrupted by loss of power, for example due to a vandal cutting the power line or removing the controller, then the alarm will continue when power is restored.

If the driver/user elects to pay via NFC, the meter's display prompts the user to hold their phone or NFC wallet to the NFC reader. The meter transmits the data to the control computer which interfaces with the appropriate institution to validate the account. If the validation is declined, the user is informed and asked to select another payment method. If the amount required to pay is greater than the balance, the user is prompted for an additional payment method. When the payment is completed, a transaction ID is displayed which allows receipt retrieval over the Internet.

If the driver elects to pay with an account, then the meter's display prompts the user to enter their account ID or swipe an account card. The driver enters the ID/swipes the card. The system prompts the user to enter their PIN. The driver enters the PIN. The meter corresponds with the central computer to validate the account, and the available balance. If the validation is declined, the user is informed and asked to select another payment method. If the amount required to pay is greater than the balance, the user is prompted for an additional payment method. When the payment is completed, a transaction ID is displayed which allows receipt retrieval over the Internet.

The user can replenish their account via the meter as well. The meter's display prompts the user to enter their account ID/swipe card. The driver enters the ID/swipe card. The meter system prompts the user to enter their PIN. The driver enters the PIN. The meter via the control computer validates the account, and the available balance. The meter then prompts the user for additional payment to add to the account. The payment can be made via any means described herein; including EFT of the parking account if associated with a bank account. When the payment is completed, a transaction ID is displayed which allows receipt retrieval over the Internet.

The meter owners/operators are provided with the ability to change many of the operating parameters of any one or more meters, including the fees, schedules, passcodes, grace periods, maximum time, and permitted cards. Each meter's settings can be accessed through a control screen accessible to the owner/operator via the control computer. The owner/operator can be provided with secured remote access to an owner/operator subsystem within the control computer system. Updated data is pushed to the selected meter(s), which implement the new settings as soon as the current space is vacated.

Figure 18:
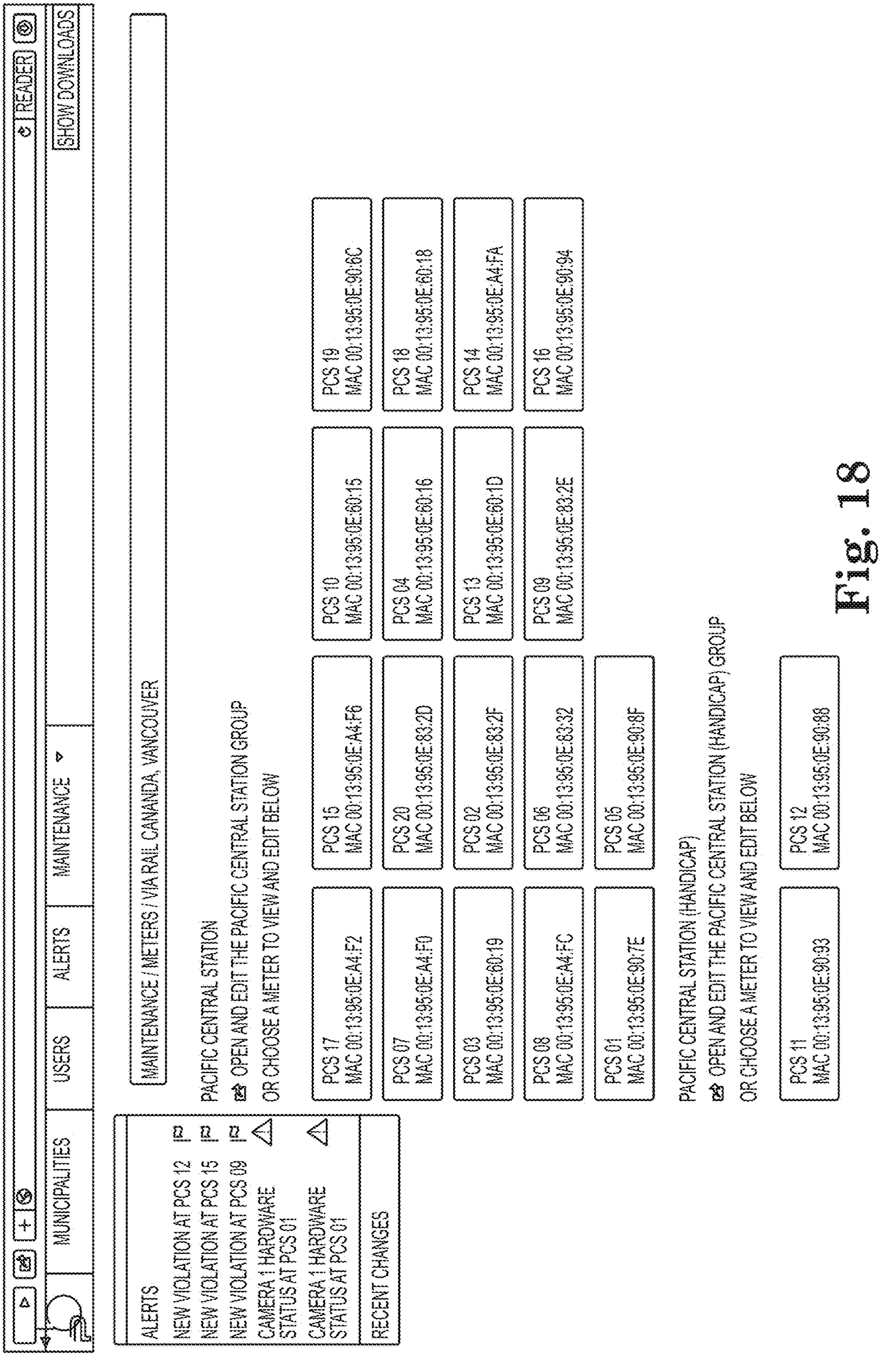
FIG. 18 is a status screen for meters in a parking system according to certain embodiments of the invention.

Referring to FIG. 18, an owner/operator maintenance screen is shown. The screen includes one block for each meter in the location selected by the user. In a previous screen, not shown the user would be provided with a list of meter locations by area or other grouping that corresponds to the user's login credentials. By selecting a particular area from the list, the user then is presented with the screen like that shown in FIG. 18.

In an alternative, the owner/operator is presented with an interactive map indicating each meter corresponding to the user's credentials. By moving the cursor on the user's screen over a given meter, relevant data for the meter would is displayed.

By clicking on a meter block in FIG. 18, or on a particular meter in the interactive map, the owner/operator will be presented with a detailed meter status screen similar to that shown in FIG. 17.

Figure 19:
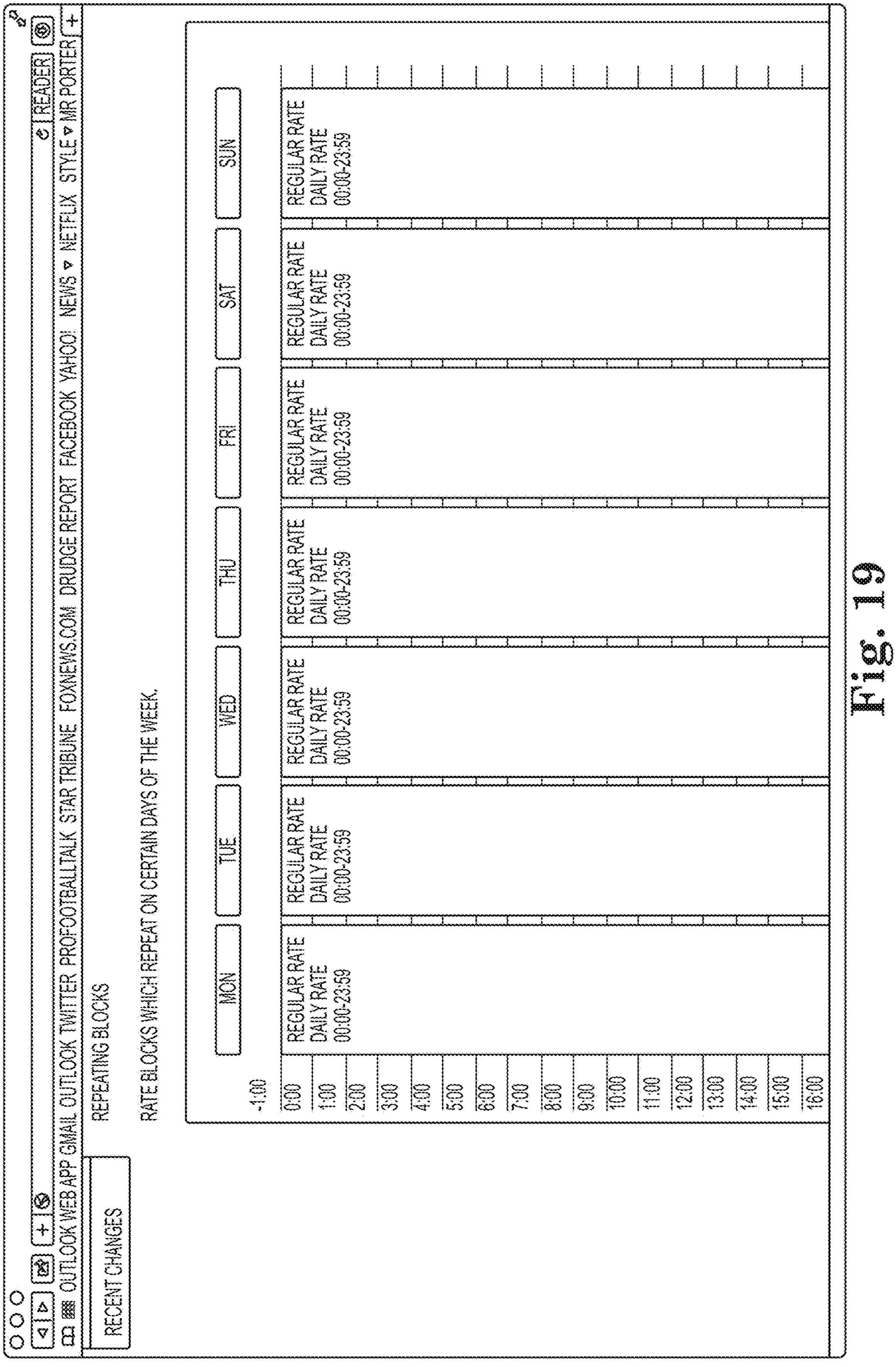
FIG. 19 is a rate block screen for a meter in a parking system according to certain embodiments of the invention.

The user can also select a rate block screen, such as that shown in FIG. 19, for each meter. The rate block screen presents the current rate data schedule for each meter for each day of the week and for every hour on each day. This visual depiction makes it easy for the owner/operator to quickly appreciate the current rate settings. Individual rate blocks can be edited in this screen by selecting the block and entering the new rate data.

Figure 20A:
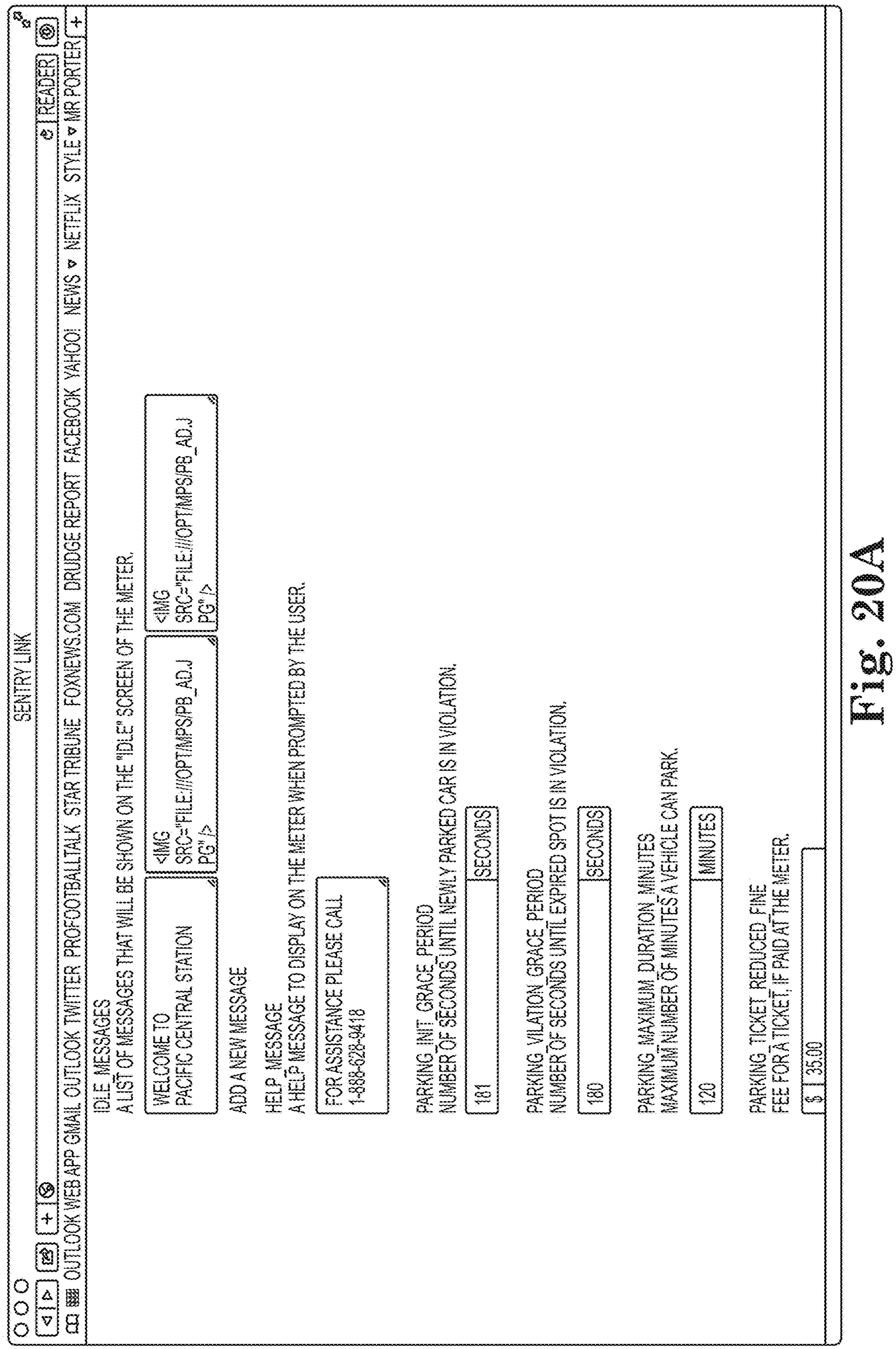
FIGS. 20A and 20B are views of a meter settings screen in a parking system according to certain embodiments of the invention.
Figure 20B:
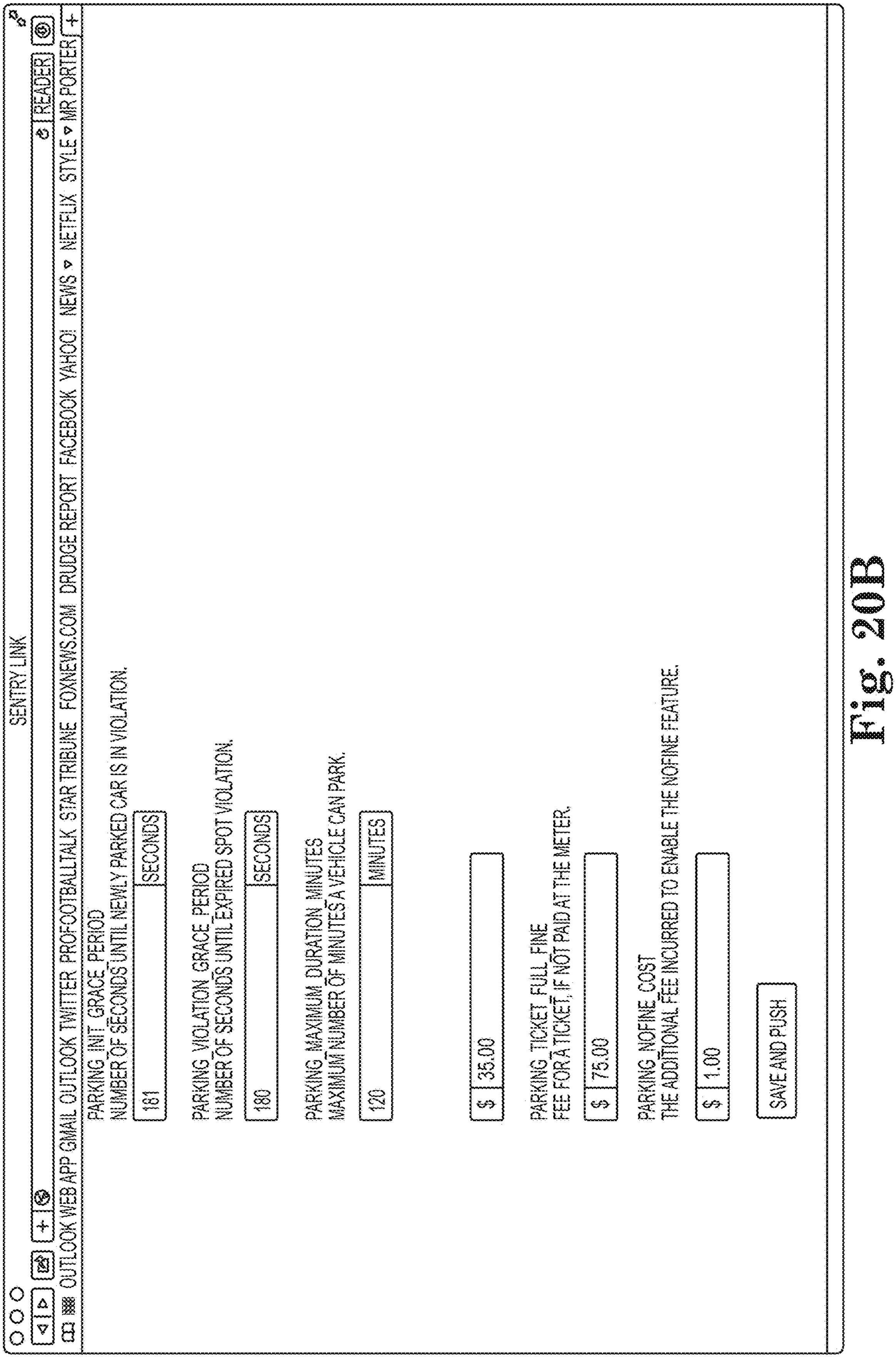

Additional parameters or settings for the meter can be accessed in a settings screen as shown in FIGS. 20A and 20B. Both figures are upper and lower portions of a single screen that is navigated by the screen scroll bar. Alterable settings include: idle message, help message, initial parking grace period, violation grace period, maximum duration of parking period, instant pay discount rate for parking violation payment, full fine fee and service fee for purchasing fine-free insurance. Each setting can be altered via the corresponding editable field. More or less editable parameters can be provided to the owner/operator without departing from the scope of the invention.

The control computer can also be configured to generate a variety of reports to the owner/operator for any one or more meter for a given time period. For example, monthly revenue can be summarized on a per-meter basis for all meters in a given municipality. Because every transaction is reported and stored in the control computer, the data and reports can be generated without querying the meter. Also, the meter thus does not have to maintain much or any transaction data, which reduces cost of the meter because memory size can be minimized, and also makes the system more secure and robust because the data is centrally stored.

The above-described features increase ease of use by drivers, ease of management by municipalities and optimize revenue capture by the municipality. The automated operation also minimizes the number of parking enforcement officers needed for a given number of metered parking spaces. Law enforcement officials are also able to better find and track persons and vehicles of interest.

In this application the terms "credit card" and "debit card" have been used. It is intended that these terms encompass the entire spectrum of card form payments, including; credit cards, debit cards, smart cards, stored value cards, proprietary parking cards, and parking passes. It will be appreciated by one skilled in that art that there are a variety of payment acceptance mechanisms that can be utilized, whether coin, paper bills, or credit card as described above.

There are several additional aspects, in certain embodiments, with respect to how violations are handled and processed, including:

The parking patron can be registered as a permit holder and pre-authorized to have all parking time billed directly to his/her credit card or other designated account. In this case no violations will be issued.

The patron's vehicle ID can be indicated as immune from violations because it is a government vehicle or other class of vehicle's designated on a non-violations list in an appropriate database.

A violation can be sent by mail. The violator's license plate is sent to the appropriate law enforcement authority where it is processed and mailed to the violator.

The patron can pay a ticket/fine via the kiosk interface.

The automated parking system can be programmed to automatically call for a tow truck from a list of towing services kept in its database and issue an order to have the vehicle removed.

The violator's plate numbers can also be compared to a database of known plate numbers flagged for outstanding parking violations, criminal records, amber alerts, stolen cars, fugitives, terrorists or other persons of interest by law enforcement authorities.

The present invention also easily facilitates permit parking. Frequent parking patrons who purchase space by the month or some other period of time are issued a permit. The purchase can be made via the kiosk or through an online portal in networked communication with the parking system. The permit purchasing patron's license plate number is entered into a system database and stored for reference by the kiosks. When a permitted vehicle enters the lot, the license plate number sent from the camera is verified against the list of license plates belonging to pre-paid customers covered by permit. There is no action required of permit customer-all of the verification work is done automatically by the system control software while the patron comes and goes freely.

Figure 21:
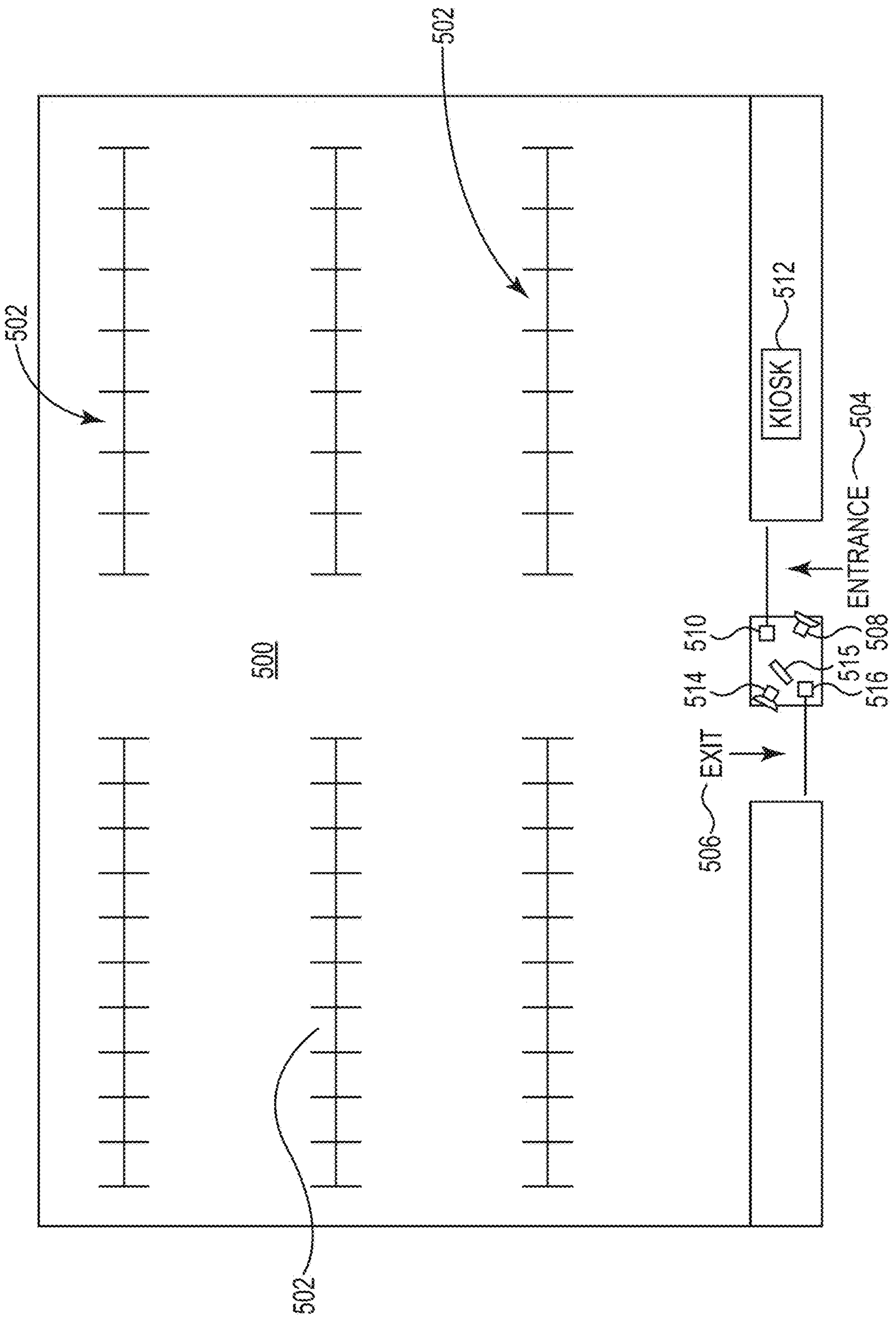
FIG. 21 is a diagram of a parking lot monitoring system according to certain embodiments of the invention.

Referring now to FIG. 21, a parking lot or parking ramp payment management system according to an example embodiment will be described. The parking lot 500 comprises a plurality of parking spaces 502. Instead of having one parking meter monitor each space (or pair of spaces), a single kiosk 512 can be used to manage parking in the entire lot/ramp 500.

The vehicle entrance 504 and exit 506 to the lot are monitored because all vehicles must pass through these limited thresholds. Of course, there can be multiple entry/exit points without departing from the scope of the invention. A plate reader 508 or camera is disposed adjacent (or associated with) each entry point 504 and configured to read the vehicle ID of every vehicle entering the parking lot/ramp/facility 500. A gate 510 can be optionally provided to only allow passage after the vehicle ID is successfully read. The vehicle ID is then transmitted or stored as described in previous embodiments.

A second camera can be disposed adjacent the entrance in addition to the plate reading camera 508 in order to take a photo of the vehicle and/or the persons in the vehicle.

In locations where vehicles have only rear plates, the entrance or exit are correspondingly configured so that the vehicle ID reading camera 508 is placed where the rear ID plate can be effectively read as the car enters the lot or as it waits for the gate arm 510 to open.

A central kiosk 512 is conveniently located in or adjacent to the parking lot/ramp/facility to accept payment. The user need only enter their plate or vehicle ID information and submit payment and the payment process, or other user interaction, proceeds according to the description provided herein above. Multiple kiosks 512 can be provided to accommodate multiple simultaneous users or to enhance convenience for users. However, each kiosk 512 can accept payment for any vehicle that entered the lot, ramp or facility.

Violations are determined and handled the same as for the previous embodiments.

Any of the meter features of the previous embodiments can also be incorporated into or used in conjunction with the kiosks of the present embodiment. Therefore those features will not be repeated again.

The exit 506 of the lot 500 is also equipped with a camera 214 in this embodiment to capture the vehicle ID, and optionally additional vehicle and people images as noted above, as the vehicle exits the lot/ramp/facility 500. An exit gate arm 516 can be optionally provided to ensure that the camera 514 successfully captured the vehicle's ID before allowing the vehicle to pass.

Also, the kiosk can be programmably configured to keep gate arm 516 down to block exit passage of a vehicle momentarily while the parking system determines whether a violation has occurred. If a violation did occur, the gate 516 can remain down or closed to the vehicle until the violation is remedied. A message can also be presented on a display 515 at the exit 506 informing the driver of a violation status and giving instructions to remedy the violation to obtain exit passage. Fines can be paid via the kiosk as discussed previously. Gate arms 510 and 516 can be any configuration and type known to those of skill in the art.

Figure 22:
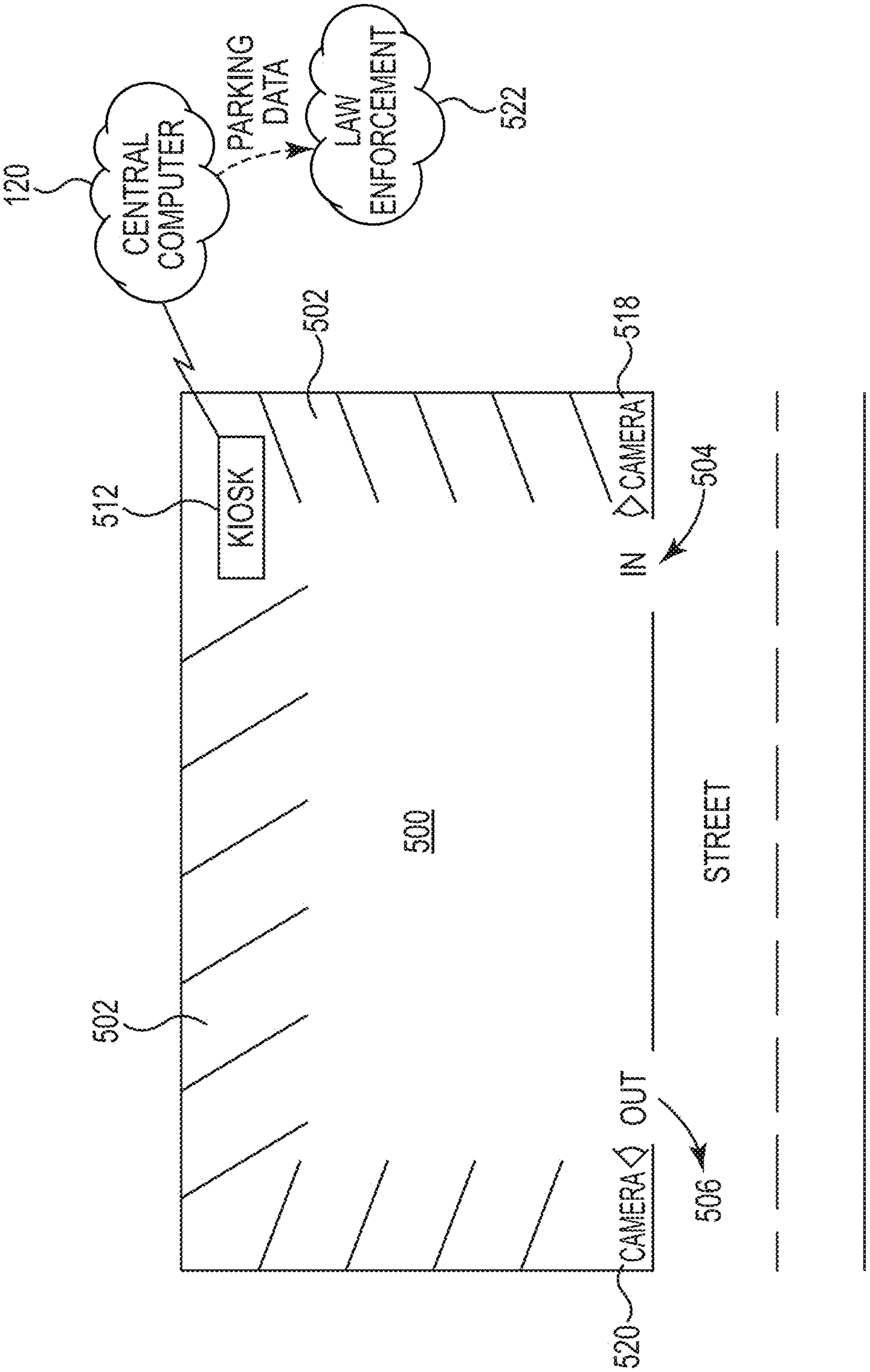
FIG. 22 is a diagram of a parking lot monitoring system according to certain embodiments of the invention.

Referring to FIG. 22, a meterless, gateless, unattended parking lot management system is depicted according to an example embodiment of the invention. This embodiment is directed to parking lots, ramps and streets for metering parking use and for ticketing as required or posted by the parking management company, or municipal regulation law or municipal guidance, without the use of physical meters or attendants or enforcement personnel. It can be used at unattended lots, ramps and street situations.

In the example of FIG. 22, there is shown one entrance 504 and one exit 506 for simplicity of explanation. One or more kiosk stations 512 for users to note their car's license plate/ID and pay for parking time are also provided. A camera 518, with license plate reading technology, is placed at the entrance 504 and exit 506 of the lot 500. Upon entering the lot 500, the camera 518 reads the license plate/ID and records it in the memory of the kiosk 512 and/or central computer system 120 networked with the kiosk 512. The driver goes to kiosk and consummates the parking transaction as described earlier in this specification.

Upon exit from the lot 500, a second camera 520 reads the vehicle license plate/ID again and takes a picture of the plate/vehicle. At that time, a total parking time amount is determined by the kiosk 512 or central computer 120 corresponding to the license plate/ID based upon the previously stored entry and exit times, and compared with the time purchased at the kiosk 512 by the driver of the vehicle being evaluated. If the time is equal or is less than that purchased, no violation is made and the nothing further is recorded-a good parking transaction. If the time is more than that purchased or pre-paid at the kiosk 512, then the purchased amount is increased and the card (payment mechanism) is charged the incremental difference. Note that the driver would have been asked by the kiosk 512 at the time of purchase to permit such true-up to avoid a ticket-insurance of no fine. Thus, this aspect comprises a remedied parking transaction.

If the vehicle had not been registered at the kiosk 512 at all by the owner and was illegitimately parking, a violation status is set, thereby automatically triggering a fine and a notice to enforcement authorities and/or tow service to tow or boot the vehicle. To accomplish this functionality, the central control system 120 uses the data from the kiosk 512 to perform license plate recognition, if not already performed by the kiosk 512 or cameras, and sends the ID or plate number to the MVD (motor vehicle department) for the owners name and address, and automatically sends a violation notice to the car's owner for payment. In this aspect, a violation occurred for illegally parking in the monitored lot/ramp/facility.

Further, in the case of pre-registered car owners, the system is programmed to recognize the authorized status by comparing the vehicle ID to the authorization database (either by the kiosk or by the central computer) to determine that no violation occurred and that the owner had proper authorization or an account on file to be billed accordingly.

Alternatively, all transactions can be performed without the kiosk and the municipality or lot owner can mail out charges to car owners based upon the LPR (license plate recognition) technology and systems implementation described herein.

This embodiment of the invention provides an unattended, automated parking lot and on street management, with no meters, optionally no kiosk, and much less hassle to the consumer, while fully automating the violation process for parkers who do not pay, or stay beyond what they have paid for.

In an additional aspect, the data generated by the parking system cameras and operational databases described previously herein are coupled to law enforcement analysis and databases. In such configuration, law enforcement agencies can perform real-time monitoring of who/what is parked where, to compare vehicle ID's (e.g. plates) against a stolen car data base, or compare ID data against a person of interest database, or other analysis related to public safety and security. Such processes could be used by law enforcement for monitoring/investigation of Amber alerts, stolen vehicles, scofflaws, felons and crime prevention, among other security related applications. This law-enforcement coupling embodiment would greatly reduce crime and increase the productivity of law enforcement agencies locally, regionally and nationwide. It would be a unique addition to the intelligence gathering done by police today, and an incremental benefit to the communities served.

Figure 23:
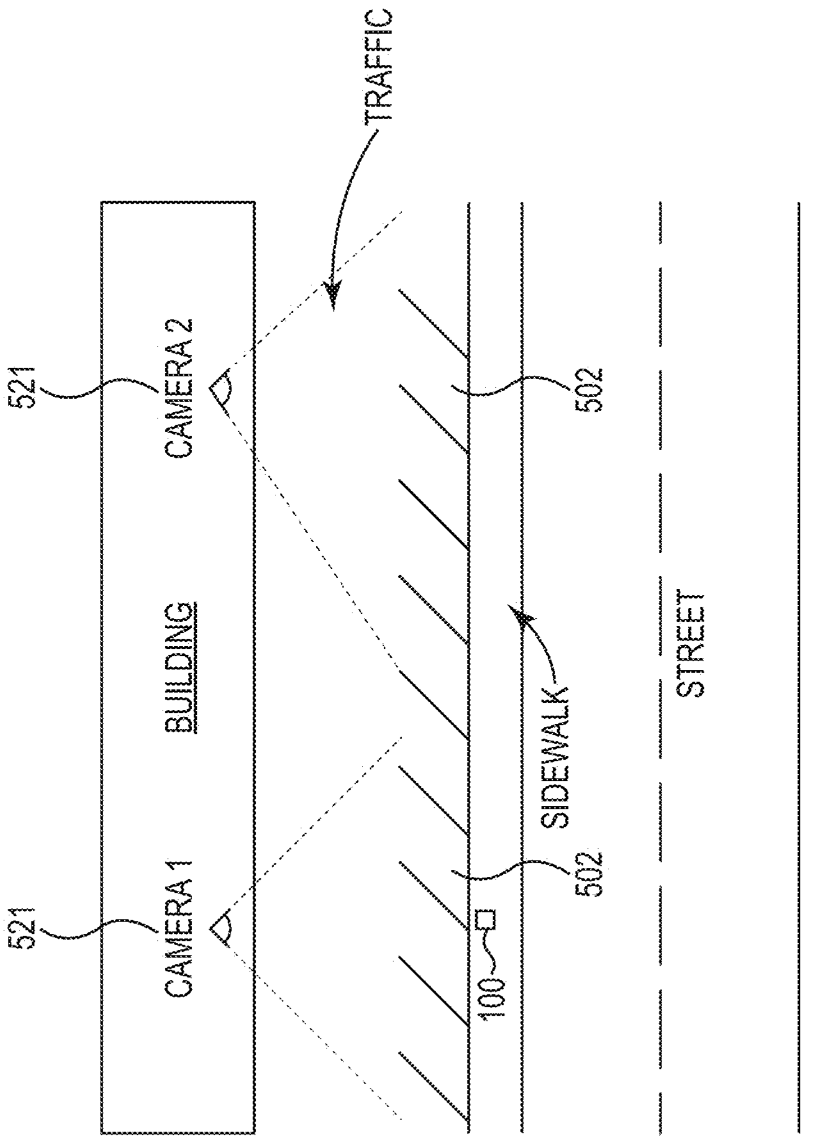
FIG. 23 is a diagram of a parking monitoring system according to certain embodiments of the invention.

FIG. 23 illustrates one example configuration addressing vehicle identification issues related to vehicles having a single rear license plate. Approximately 19 states in the U.S. and several Canadian provinces use only one license plate located on the rear of the vehicle. This presents some hurdles to obtaining the vehicle's identification. For parallel parking, an embodiment of the invention solves this problem with a two camera LPR/OCR (optical character recognition) meter system.

In a so-called "head-in" parking configuration, such as that shown in FIG. 23, supplemental cameras 521 with LPR are mounted to a wall of a building (or other fixed structure) behind the parked vehicles in spaces 502. The supplemental cameras 521 are equipped with wide angle and LPR technology. Thus they can each capture as many as 10-20 rear vehicle plates within its field of view and read these plates from a distance, and identify the specific location of each plate.

In the depicted example a front parking meter 100 located in front of the parking space 502 detects no front plate. It then queries the supplemental camera 521 (via Wi-Fi, LAN, etc.) that is assigned to the particular front meter to read the rear plate of the vehicle. The kiosk/meter 100 or the central computer combines the data for the front and back plate readings for the vehicle in question. Therefore, in one embodiment, when a car with only one rear plate enters the space 502, the meter recognizes this, sends a message with parking space number to the central server, which requests the correct supplemental camera 521 to 'read the plate' and match that with the car in the parking space. Thus, this arrangement can accommodate automated identification and parking management for both single and double plated cars. The process for metering and ticket violations proceeds as described previously.

Figure 24:
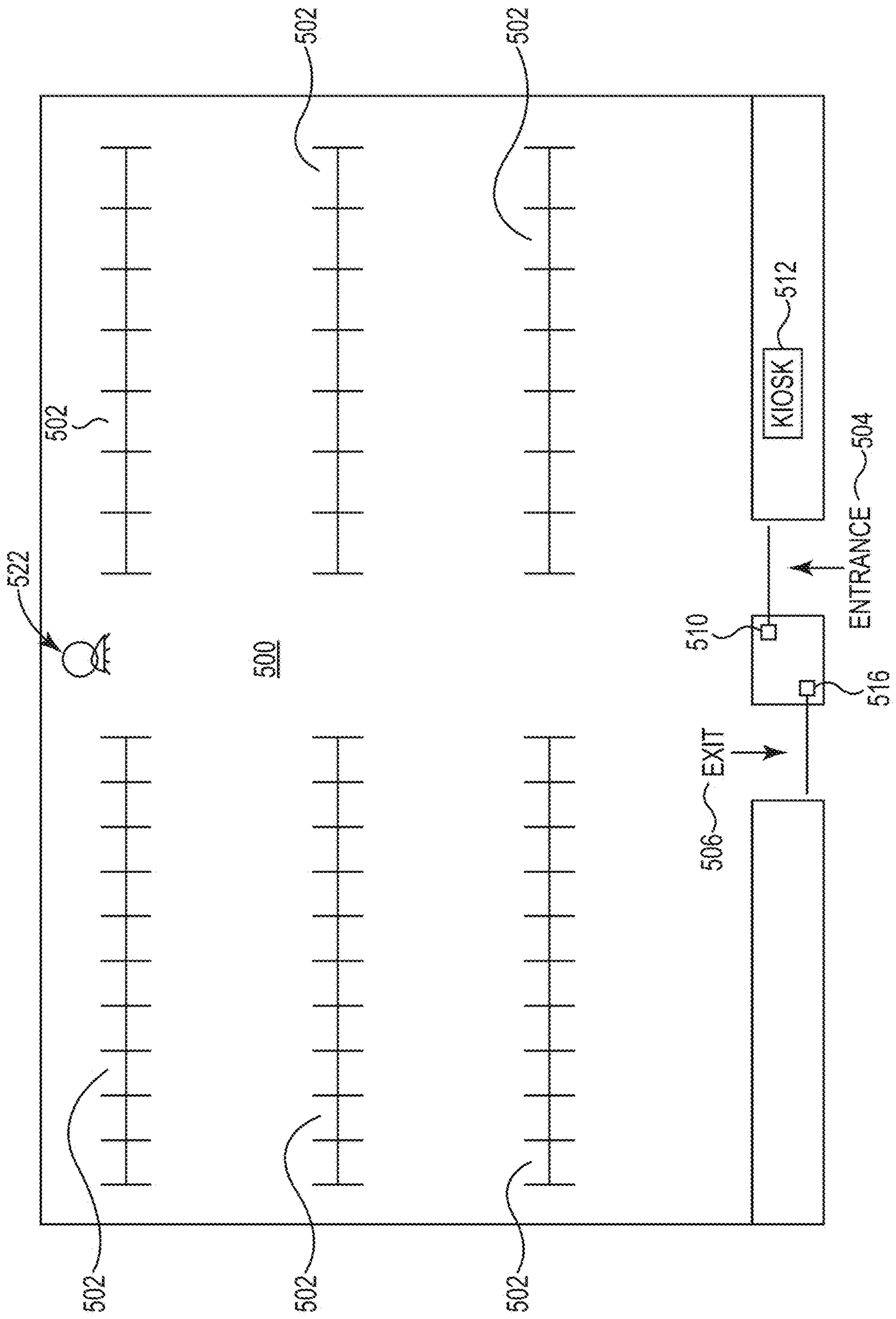
FIG. 24 is a diagram of a parking system according to certain embodiments of the invention.

In an alternative embodiment, as depicted in FIG. 24, the entrance/exit cameras are replaced with a single license plate reading camera 522 mounted at an elevated position above the parking lot 500. The elevated position can be, for example, at the top of a pole in a position that the camera can see the entrance 504 and exit 506 simultaneously within the camera's fixed field of view. The elevated position allows the camera 522 to read the license plates of all cars entering and exiting the parking lot. The camera communicates license plate images or data to kiosk 512 as described previously. The single camera 522 reduces the equipment costs and places the camera in a location with lower likelihood of damages due to vandalism. The camera 522 can be disposed within a protective housing. The camera 522 can also be equipped with motors to selectively adjust rotation angle (azimuth) and elevation angle. The camera lens can also be equipped with zoom capability.

Figure 25:
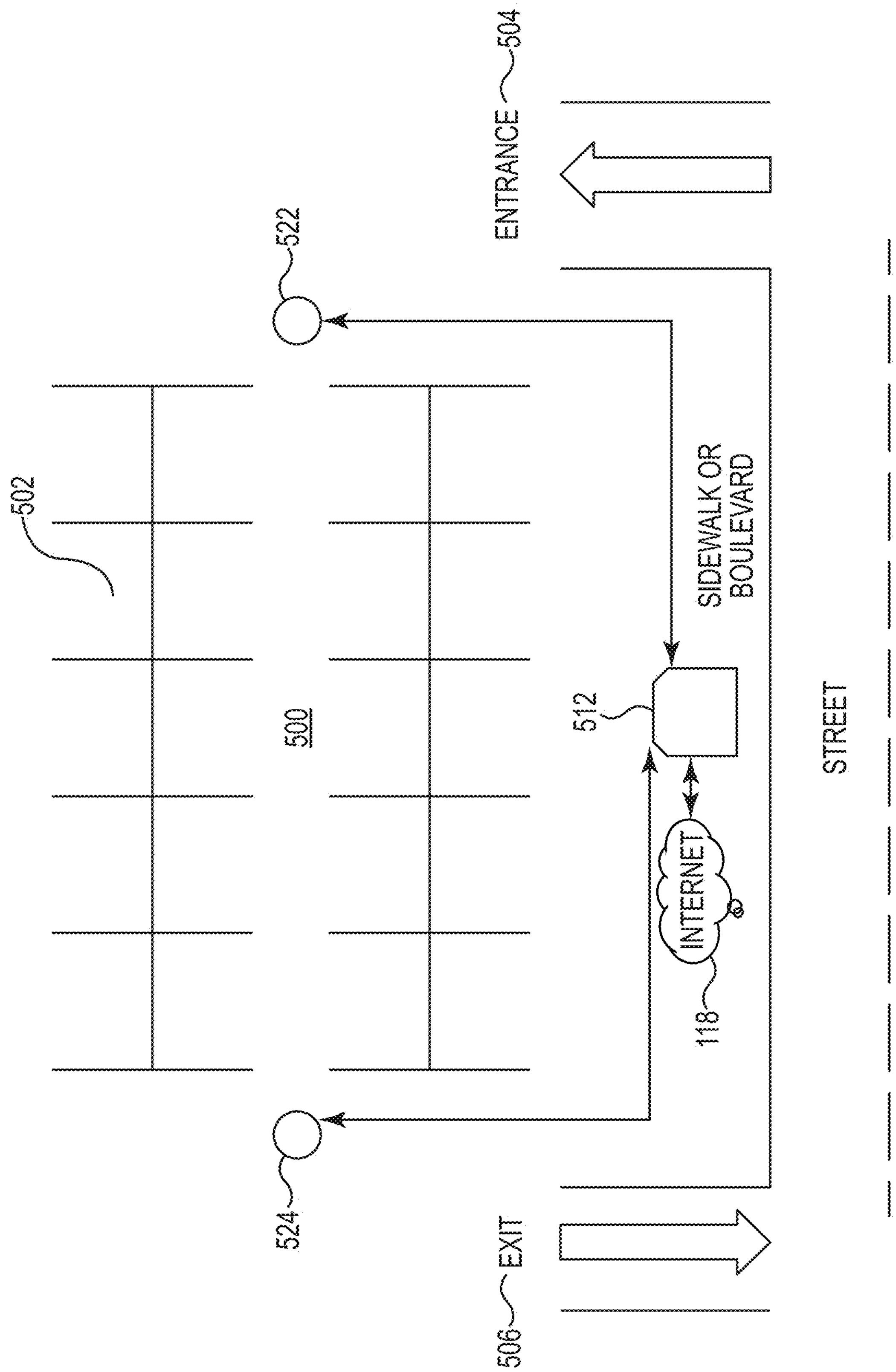
FIG. 25 is a diagram of a parking system according to certain embodiments of the invention.

Additional entrances/exits can be monitored with the same single camera 522, if in that camera's effective field of view. If not, then an additional elevated camera 524 can be utilized as shown in the alternative configuration of FIG. 25. A combination of entrance/exit cameras and elevated plate reading cameras can also be used in further embodiments of the invention.

The Kiosk 512 can be one or more smart parking meters/kiosks as described herein above, including any and all of the aforementioned features and functions. The kiosk 212 can be a stand-alone device. Or, for enhanced functionality, the kiosk 512 can be connected to a network 118 (e.g., via internet or LAN) as discussed herein (and shown in FIG. 25), so that the kiosk 512 can interface with central control computers and databases.

An advantage of certain embodiments is that electromechanical gates can be eliminated, if desired. Such gates are costly and can fail.

Figure 26:
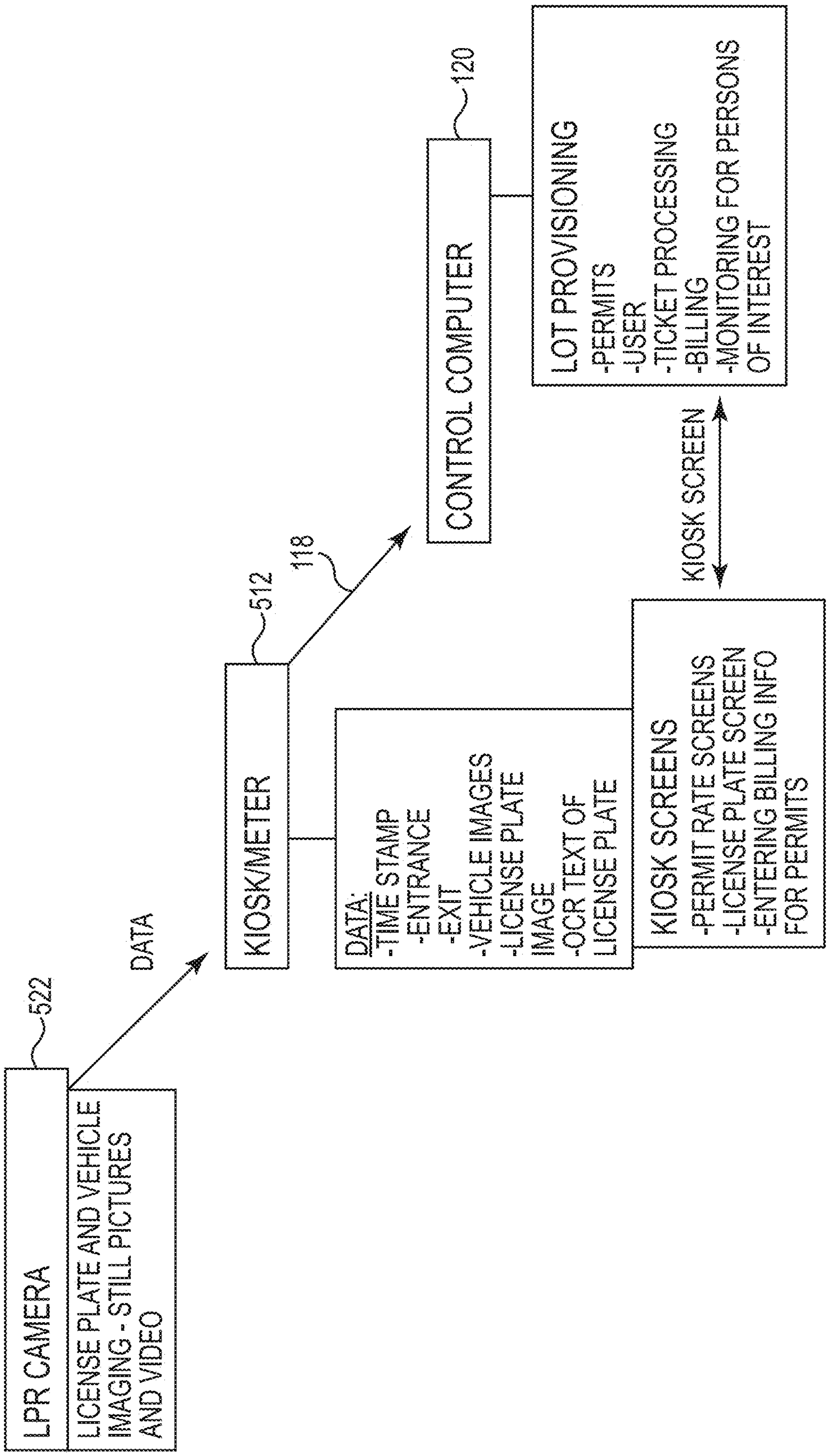
FIG. 26 is a schematic diagram of a parking system according to certain embodiments of the invention.

In use according to an example embodiment, and referring to FIG. 26, a camera 522 associated with the entrance of the lot takes a picture of the arriving vehicle's license plate, adds a time stamp, and sends the information/data to the kiosk 512. The kiosk 512 control software, stored in memory in the kiosk and executed via the processor in the kiosk, then records the moment of the vehicle's entrance and starts a timer. The license plate image is converted to text for further processing. The kiosk 512 transmits the license plate and time data (both images and text preferably) via the network 118 to a control computer 120 located in a remote location.

The LPR function can be performed by the kiosk's microprocessor using LPR software stored in memory in the kiosk/meter. Alternatively, the LPR function can be performed by the central computer 120 networked with the kiosk 512.

The parking patron is given some amount of time, for example 15 minutes, to pay. The patron locates the kiosk 512 which instructs him to enter his/her vehicle license plate number and then supply payment (e.g., insert a credit card) to complete the transaction. The system is programmed to match the license plate number entered to the number captured by the camera and acknowledges the payment.

If the parking patron does not enter a vehicle license number within the given amount of time, then a violation status occurs. The vehicle's license plate information is sent to the central computer or server, which is interfaced with motor vehicle department records. The owners name and address is determined and a ticket or violation notice is automatically sent to that owner for payment.

Upon departure, a camera associated with the exit 522 (which may be the same camera as above or a different camera) captures another image of the vehicle's license plate and again sends it to the kiosk 512. The kiosk 212 is programmed to calculate the amount of time spent in the lot and compare it to the amount of parking time purchased.

As long as the vehicle exits the lot on or before the expiration of the parking time purchased, no violation is issued. If the patron doesn't pay with an accepted payment means or leaves his/her vehicle in the lot beyond the expiration period, the system is programmed to issue a violation. Notice of the violation is also sent to the appropriate law enforcement authorities, if desired by the municipality.

Alternatively, all transactions could be done without the kiosk 512 and the municipality or lot owner could mail out charges to car owners based upon the LPR technology and systems implementation described herein.

The present invention can also monitor the low/spaces for illegal parking activities such as double parking, hydrant proximity and other no parking restrictions. Offender's can be cited as described herein above.

While the invention has been described in connection with what is presently considered to be the most practical and preferred example embodiments, it will be apparent to those of ordinary skill in the art that the invention is not to be limited to the disclosed example embodiments. It will be readily apparent to those of ordinary skill in the art that many modifications and equivalent arrangements can be made thereof without departing from the spirit and scope of the present disclosure, such scope to be accorded the broadest interpretation of the appended claims so as to encompass all equivalent structures and products.

For purposes of interpreting the claims for the present invention, it is expressly intended that the provisions of Section 112, sixth paragraph of 35 U.S.C. are not to be invoked unless the specific terms "means for" or "step for" are recited in a claim.

What is claimed is:

1. A system for enforcing parking rules at multiple parking facilities, wherein vehicles enter a first parking facility to park in one of a plurality of parking spaces within the first parking facility, and vehicles exit the first parking facility to leave the first parking facility, the system comprising:

a remote computer system communicatively coupled to a communication network, the remote computer system being remote from the first parking facility, one or more databases communicatively coupled to the computer system, the one or more databases storing data defining:

parking rules associated with the first parking facility, including a plurality of parking rates each rate associated with a respective time period; and a registration list that associates vehicle license plate characters with payment information;

a first camera positioned to automatically capture first image data associated with a first vehicle when the first vehicle enters the parking facility;

a second camera positioned to automatically capture second image data associated with the when the first vehicle exits the first parking facility;

one or more processors that perform automated character recognition analysis of the first image data captured with the first camera and of the second image data captured with the second camera, wherein a result of the automated character recognition analysis comprises characters corresponding to a license plate of the first vehicle; and one or more network interface devices communicatively coupled to the first and second cameras to automatically transmit to the remote computer system the first image data and the second image data and time information corresponding to when the first vehicle entered and when the first vehicle exited the first parking facility, wherein the remote computer system is configured to automatically determine when a parking violation has occurred by the first vehicle based at least in part on a time associated with first vehicle entering the first parking facility, and by referencing the parking rules and the registration list, and to automatically generate a parking violation notice that is populated with at least the characters corresponding to the license plate of the first vehicle, the time of entry for the first vehicle, and an image of the first vehicle based on the first and/or the second image data captured at the first parking facility.

2. The system of claim 1, wherein the remote computer system is further configured to automatically determine when a parking violation has occurred based at least in part on a time associated with the license plate of the first vehicle exiting the first parking facility.

3. The system of claim 1, wherein the parking rules include a grace period.

4. The system of claim 1, wherein the parking rules include a maximum parking time.

5. The system of claim 1, wherein the parking rules include a plurality of different parking fee rates, each of the plurality of different parking fee rates corresponding to a different one of the respective time periods.

6. The system of claim 1, wherein the first camera performs license plate recognition using a plurality of characters on a license plate on the first vehicle using the first image data of the first vehicle entering the first parking facility.

7. The system of claim 1, wherein the remote computer system is not in communication with a gate at the first parking facility.

8. The system of claim 1, wherein the remote computer system is in communication with a gate at the first parking facility to control entry of the first vehicle to the first parking facility and/or to control exit of the first vehicle from the first parking facility.

9. The system of claim 1, further comprising a scannable QR code at the first parking facility for providing a link to a user of the first parking facility to communicate with the remote computer system.

10. The system of claim 9, wherein the registration list is capable of being updated with vehicle registration and account payment information supplied to the remote computer system via the link.

11. The system of claim 1, further comprising a kiosk at the first parking facility that is communicatively coupled to the remote computer system, the kiosk being capable of communicating a registration for the first vehicle that includes vehicle license plate information and account payment information associated with the vehicle.

12. The system of claim 1, wherein the first camera automatically records time of entry data when the first vehicle enters the first parking facility.

13. The system of claim 12, wherein the remote computer system automatically determines whether the first vehicle that entered the first parking facility is listed in the registration list and wherein the remote computer system is configured to determine that the violation has occurred based at least in part on whether the first vehicle is or is not listed in the registration list.

14. The system of claim 1, wherein the remote computer system is coupled to receive image data and time information from at least a second parking facility, and wherein the remote computer system is configured to automatically determine when a parking violation has occurred based at least in part on image data and time information received from the at least a second parking facility.

15. The system of claim 1, wherein the remote computer system being configured to automatically generate the parking violation notice comprises displaying on a screen of a computing device at least the characters on the first vehicle license plate, the time of entry for the first vehicle, and the image of the first vehicle based on the first and/or the second image data captured at the first parking facility.

16. A system for generating parking violation notices for a plurality of parking facilities, wherein a first parking facility of the plurality of parking facilities has at least a first entrance, at least a first exit, and a plurality of parking spaces, wherein a vehicle enters the first parking facility through the first entrance and leaves the parking facility through the first exit, the system comprising:

a remote computer system communicatively coupled to a communication network, the remote computer system being remote from the first parking facility, one or more databases communicatively coupled to the computer system, the one or more databases storing data defining:

parking rules associated with the first parking facility, including at least one parking rate; and a registration list that associates vehicle license plate numbers with payment information;

a first camera installed within line of sight of the first entrance to the first parking facility to automatically capture entry image data of a first vehicle entering the first parking facility, the first camera being communicatively coupled to a network interface for communicating with the remote computer system over the communication network;

a second camera installed within line of sight of the first exit to the first parking facility to automatically capture exit image data of the first vehicle exiting the first parking facility, the second camera being communicatively coupled to a network interface for communicating with the remote computer system over the communication network, wherein the first camera automatically records time of entry for the first vehicle and transmits time of entry data and entry image data associated with the first vehicle to the remote computer system, wherein the second camera automatically records time of exit for the vehicle and transmits time of entry data and exit image data associated with the first vehicle to the remote computer system;

one or more processors that perform automated character recognition analysis of the entry image data captured with the first camera to produce a first character output corresponding to a license plate number of the first vehicle; and one or more processors that perform automated character recognition analysis of the exit image data captured with the second camera to produce a second character output corresponding to a license plate of the first vehicle;

wherein the remote computer system is configured to automatically determine when a parking violation has occurred by the first vehicle based at least in part on a time associated with the first vehicle entering the first parking facility and by referencing the parking rules and the registration list, and wherein the remote computer system is configured to automatically generate a parking violation notice that is populated with at least one of the first and second character outputs, the time of entry for the first vehicle, and an image of the first vehicle based on image data captured at the first parking facility.

17. The system of claim 16, wherein the one or more processors that perform automated character recognition analysis of the entry image data are located with the first camera.

18. The system of claim 17, wherein the one or more processors that perform automated character recognition analysis of the exit image data are located with the second camera.

19. The system of claim 16, wherein the one or more processors that perform automated character recognition analysis of the entry image data are located with the remote computer system.

20. The system of claim 16 wherein the parking rules associated with the first parking facility include a plurality of parking rates, each parking rate associated with a different respective time period.

21. The system of claim 16, wherein the parking rules associated with the first parking facility include parking rates that are dynamically adjustable based on demand for parking spaces.

22. The system of claim 16, wherein the remote computer system is further configured to automatically determine when a parking violation has occurred based at least in part on the exit time of the first vehicle.

23. The system of claim 16, wherein the remote computer system does not control any gate at the first parking facility.

24. The system of claim 16, wherein the remote computer system is in communication with a gate at the first parking facility to control entry of the first vehicle to the first parking facility or exit of the first vehicle from the first parking facility.

25. The system of claim 16, further comprising a scannable QR code at the first parking facility for providing a link to a user of the first parking facility to communicate with the remote computer system.

26. The system of claim 25, wherein the registration list is capable of being updated with vehicle registration and account payment information supplied to the remote computer system via the link.

27. The system of claim 16, further comprising a kiosk at the first parking facility that is communicatively coupled to the remote computer system, the kiosk being capable of communicating a registration for the first vehicle that includes vehicle license plate information and account payment information associated with the vehicle.

28. The system of claim 16, wherein the remote computer system automatically determines whether the first vehicle is listed in the registration list after the first vehicle enters the first parking facility, and wherein the remote computer system is configured to determine that the violation has occurred based at least in part on whether the first vehicle is or is not listed in the registration list.

29. The system of claim 16, wherein the remote computer system is coupled to receive image data and time information from at least a second parking facility of the plurality of parking facilities, and wherein the remote computer system is configured to automatically determine when a parking violation has occurred based at least in part on the image data and time information received from the at least second parking facility.

30. The system of claim 16, wherein the remote computer system being configured to automatically generate the parking violation notice comprises displaying on a screen of a computing device at least the characters on the first vehicle license plate, the time of entry for the first vehicle, and the image of the first vehicle based on the first and/or the second image data captured at the first parking facility.

* * * * *